United States Patent
Watanabe et al.

(10) Patent No.: US 7,909,364 B2
(45) Date of Patent: Mar. 22, 2011

(54) INDICATOR FOR INDICATING AUTHENTICITY

(75) Inventors: Masachika Watanabe, Tokyo-To (JP);
Masanori Umeya, Tokyo-To (JP);
Minoru Azakami, Tokyo-To (JP);
Tsuyoshi Yamauchi, Tokyo-To (JP);
Koji Eto, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 707 days.

(21) Appl. No.: 11/514,984

(22) Filed: Sep. 5, 2006

(65) Prior Publication Data
US 2007/0085334 A1    Apr. 19, 2007

(30) Foreign Application Priority Data

Sep. 7, 2005  (JP) .................................. 2005-259981
Sep. 7, 2005  (JP) .................................. 2005-259982

(51) Int. Cl.
*B42D 15/00*  (2006.01)
*G03H 1/02*  (2006.01)

(52) U.S. Cl. ................ 283/91; 283/85; 283/87; 283/90; 283/94; 359/2

(58) Field of Classification Search .................... 283/72, 283/85, 87, 90, 91, 94
See application file for complete search history.

(56) References Cited

U.S. PATENT DOCUMENTS

| 7,391,546 | B2* | 6/2008 | Hoshino et al. | 359/2 |
| 2002/0051264 | A1* | 5/2002 | Shiozawa et al. | 359/2 |
| 2003/0133098 | A1* | 7/2003 | Hoshino et al. | 356/71 |

FOREIGN PATENT DOCUMENTS

| JP | A 2004-133179 | 4/2004 |
| JP | B 3652487 | 3/2005 |

OTHER PUBLICATIONS

3D Optical Systems http://www.3dopticalsystems.com/volumehologram.html.*

* cited by examiner

*Primary Examiner* — Dana Ross
*Assistant Examiner* — Kyle Grabowski
(74) *Attorney, Agent, or Firm* — Oliff & Berridge, PLC

(57) ABSTRACT

An object of the present invention is to provide an authenticity indicator that cannot be easily forged, that is clearly distinguishable, and that can be elaborately designed. An authenticity indicator 101 is in the form of a sheet and can be checked for its authenticity by observing the light reflected from it. The authenticity indicator comprises a first reflective layer 12 comprising a reflective area 12*a* that reflects specified light, and a second reflective layer 15 that reflects specified light. The reflective area of the first reflective layer has a cholesteric liquid crystalline structure. The second reflective layer comprises a volume hologram.

15 Claims, 17 Drawing Sheets

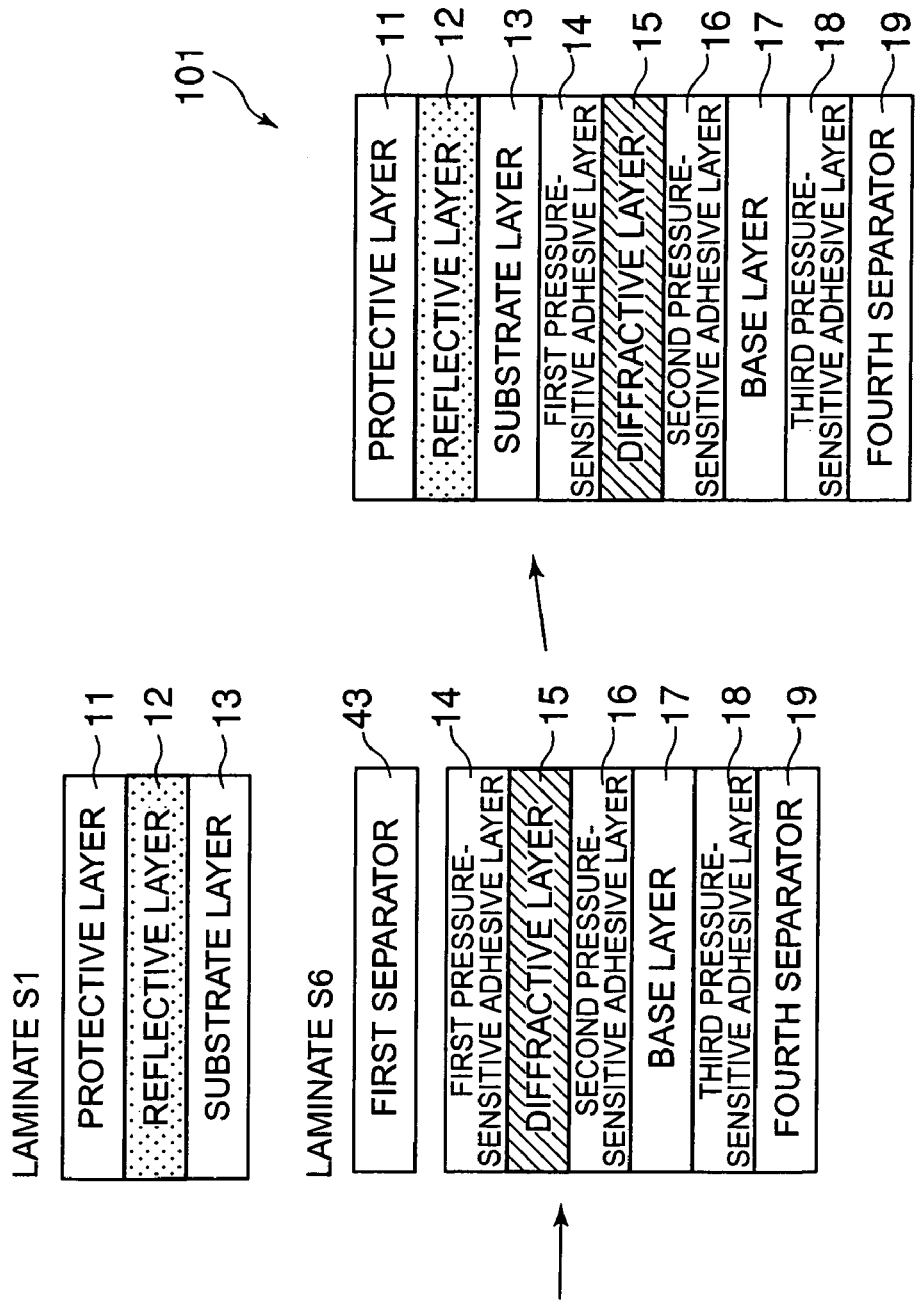

INDICATOR FOR INDICATING AUTHENTICITY

CROSS REFERENCE TO RELATED APPLICATIONS

This application is based on the prior Japanese Patent Applications No. 2005-259981 and No. 2005-259982 filed on Sep. 7, 2005, and the entire contents of these two applications are incorporated herein by reference.

BACKGROUND OF THE INVENTION

1. Field of the Invention

The present invention relates to an authenticity indicator for indicating the authenticity of an article or the like.

2. Background Art

Authenticity indicators (identification media) for indicating the authenticity of articles or the like have been attached to objects as a means of preventing forgery of cards, passports, identification cards, gift certificates, etc. or of detecting forgeries, fakes, etc. Namely, the authenticity of objects to which authenticity indicators are attached is confirmed by checking the authenticity of the authenticity indicators themselves. It is therefore necessary that the authenticity indicators cannot be easily forged and that the authenticity of the authenticity indicators themselves can be checked accurately.

Hologram labels using relief holograms have been known as the above-described authenticity indicators. In recent years, however, techniques for forgery of holograms of this type have advanced, and holographic materials have become easily available, so that there are possibilities that the hologram labels might be skillfully forged and that the forged hologram labels might be overlooked while they are practically used.

Cholesteric liquid crystals, which have both polarized-light selectivity and wavelength selectivity and which reflect light so that the reflected light changes in color when an observer changes his viewing angle, have also been used for authenticity indicators. However, forgery techniques have advanced in recent years, and even authenticity indicators using cholesteric liquid crystals are in danger of forgery.

The Japanese Patent Publication No. 3652487 (the entire contents of this patent publication are incorporated herein by reference) discloses identification media (authenticity indicators) comprising a relief hologram layer and a cholesteric liquid crystal layer.

In the identification media disclosed in the above patent publication, however, the cholesteric liquid crystal layer acts merely as reflective layer for reflecting incident light to the relief hologram layer. Further, the authenticity of the identification media can be confirmed only on the basis of the images reconstructed from the relief holograms. Moreover, relief holograms have come to be forged as described above. Thus, although the production of these identification media costs much labor, their distinguishability and forgery prevention effect are comparable only to those of the above-described authenticity indicators using either relief holograms or cholesteric liquid crystals alone.

SUMMARY OF THE INVENTION

The preset invention was accomplished in the light of the above-described drawbacks. An object of the present invention is therefore to provide an authenticity indicator that cannot be easily forged and that is clearly distinguishable.

An authenticity indicator according to the present invention is one in the form of a sheet, whose authenticity can be checked by observing the light reflected from it, comprising a reflective layer including a reflective part, the reflective part having a cholesteric liquid crystalline structure and reflecting a specified light, and a diffractive layer including a volume hologram and diffracting a specified light.

According to the authenticity indicator of the present invention, its authenticity can be checked more accurately, making use of the function of reflecting only specified light that the reflective layer has and the function of diffracting only specified light that the diffractive layer has. Further, since the production of a volume hologram requires special facilities, materials, and so forth, it is not easy to make a copy of the authenticity indicator of the invention. For this reason, the authenticity indicator of the present invention has the enhanced function of indicating authenticity and is highly effective for forgery prevention.

In the authenticity indicator of the present invention, a wavelength range of the specified light reflected from the reflective layer and a wavelength range of the specified light diffracted by the diffractive layer may overlap at least partly. Such an authenticity indicator is advantageous in that both the light reflected from the reflective layer and the light diffracted by the diffractive layer can be seen. And by putting a circular polarizer (a circular polarization plate) on this authenticity indicator, it is possible to make only the light diffracted by the diffractive layer clearly visible. The authenticity of the authenticity indicator can thus be checked simply and more accurately. Further, since the wavelength range of the light that the reflective layer reflects and the wavelength range of the light that the diffractive layer diffracts overlap, the light reflected from the reflective layer can be viewed under the conditions under which the light diffracted by the diffractive layer can be seen. Therefore, if a copy volume hologram is prepared using this authenticity indicator as a master, the light reflected from the reflective layer is also recorded in the copy product. Such a copy product can be detected with ease and certainty either by visual observation or by above method of authenticity checking using a circular polarizer, for example. Namely, it is extremely difficult to make forgery from the authenticity indicator of the present invention.

Further, in the authenticity indicator of the present invention, one of the two wavelength ranges, the wavelength range of the specified light reflected from the reflective layer and the wavelength range of the specified light diffracted by the diffractive layer, may cover the other. Such an authenticity indicator is advantageous in that both the light reflected from the reflective layer and the light diffracted by the diffractive layer can be seen. And by putting a circular polarizer on this authenticity indicator, it is possible to make only the light diffracted by the diffractive layer clearly visible. The authenticity of the authenticity indicator can thus be checked simply and more accurately. Further, since the wavelength range of the light that the reflective layer reflects and the wavelength range of the light that the diffractive layer diffracts overlap, the light reflected from the reflective layer can be viewed even under the conditions under which the light diffracted by the diffractive layer can be seen. Therefore, if a copy volume hologram is prepared using this authenticity indicator as a master, the light reflected from the reflective layer is also recorded in the copy product. Such a copy product can be detected with ease and certainty either by visual observation or by above method of authenticity checking using a circular polarizer, for example. Namely, it is extremely difficult to make forgery from the authenticity indicator of the present invention.

Furthermore, in the authenticity indicator of the present invention, one of the two wavelength ranges, the wavelength range in which a quantity of light is a half or more of a maximum quantity of light in a quantity distribution, relative to wavelength, of the specified light reflected from the reflective layer and the wavelength range in which a quantity of light is a half or more of a maximum quantity of light in a quantity distribution, relative to wavelength, of the specified light diffracted by the diffractive layer, may cover the other. Namely, one of the two wavelength ranges, the wavelength range corresponding to the full width half maximum (FWHM) of the reflective layer and the wavelength range corresponding to the full width half maximum (FWHM) of the diffractive layer, may cover the other. Such an authenticity indicator is advantageous in that both the light reflected from the reflective layer and the light diffracted by the diffractive layer can be seen more clearly. And by putting a circular polarizer on this authenticity indicator, it is possible to make only the light diffracted by the diffractive layer clearly visible. The authenticity of the authenticity indicator can thus be checked with higher accuracy. This authenticity indicator is excellent not only from the viewpoint of authenticity checking but also from the viewpoint of forgery prevention. The reason for this is as follows: this authenticity indicator is that a wavelength range of a light to be reflected from the reflective layer at high reflectance and a wavelength range of a light to be diffracted by the diffractive layer at high diffraction efficiency can overlap, so that the light reflected from the reflective layer can be clearly seen under the conditions under which the light diffracted by the diffractive layer can be clearly seen; therefore, if a copy volume hologram is prepared using this authenticity indicator as a master, the light reflected from the reflective layer is also recorded in the copy product, which makes it possible to detect such a copy product with ease and certainty either by visual observation or by a method of authenticity checking using a circular polarizer, for example. Namely, it is extremely difficult to make forgery from the authenticity indicator of the present invention.

Furthermore, in the authenticity indicator of the present invention, a wavelength (selective reflection center wavelength) at which a quantity of light peaks in a quantity distribution, relative to wavelength, of the specified light reflected from a reflective layer may be longer than a wavelength (selective reflection center wavelength) at which a quantity of light peaks in a quantity distribution, relative to wavelength, of the specified light diffracted by the diffractive layer. Generally, a cholesteric liquid crystalline structure shows wavelength selectivity sharper on the longer wavelength side than on the shorter wavelength side. It is therefore easy to make the wavelength range of the light that the reflective layer reflects and the wavelength range of the light that the diffractive layer diffracts overlap partly or wholly. Namely, above authenticity indicator that is extremely difficult to be forged can be produced with ease and certainty.

Furthermore, in the authenticity indicator of the present invention, a wavelength range of the specified light reflected from the reflective layer may be outside a wavelength range of the specified light diffracted by the diffractive layer. Such an authenticity indicator is advantageous in that the light reflected from the reflective layer is distinguishable from the light diffracted by the diffractive layer by its color, which makes it possible to confirm easily whether the light reflected from the reflective layer is present or not and whether the light diffracted by the diffractive layer is present or not. Checking of the authenticity indicator for its authenticity can therefore be done with higher accuracy.

Furthermore, in the authenticity indicator of the present invention, a wavelength range in which a quantity of light is a half or more of a maximum quantity of light in a quantity distribution, relative to wavelength, of the specified light reflected from the reflective layer may be outside a wavelength range in which a quantity of light is a half or more of a maximum quantity of light in a quantity distribution, relative to wavelength, of the specified light diffracted by the diffractive layer. Such an authenticity indicator is advantageous in that the light reflected from the reflective layer is clearly distinguishable from the light diffracted by the diffractive layer by its color, which makes it possible to confirm with ease and certainty whether the light reflected from the reflective layer is present or not and whether the light diffracted by the diffractive layer is present or not. Checking of the authenticity indicator for its authenticity can therefore be done more accurately.

Furthermore, in the authenticity indicator of the present invention, a wavelength (selective reflection center wavelength) at which a quantity of light peaks in a quantity distribution, relative to wavelength, of the specified light reflected from the reflective layer may be shorter than a wavelength (selective reflection center wavelength) at which a quantity of light peaks in a quantity distribution, relative to wavelength, of the specified light diffracted by the diffractive layer. Generally, a cholesteric liquid crystalline structure shows wavelength selectivity sharper on the longer wavelength side than on the shorter wavelength side. It is therefore possible to make more clearly a distinction between the wavelength range of the light that the reflective layer reflects and the wavelength range of the light that the diffractive layer diffracts. For this reason, the authenticity of this authenticity indicator can be checked with higher accuracy.

Furthermore, in the authenticity indicator of the present invention, the reflective part of the reflective layer may be superposed only on a part of the diffractive layer. Namely, the reflective part may be patterned on the diffractive layer so that its outline is present on the diffractive layer. Such an authenticity indicator is advantageous in that the light reflected from the reflective layer can be recognized as a pattern that the reflective part forms. Whether the light reflected from the reflective layer is present or not can therefore be clearly confirmed by visual observation. Checking of the authenticity indicator for its authenticity can thus be done with higher accuracy.

Furthermore, in the authenticity indicator of the present invention, the reflective part may have the cholesteric liquid crystalline structure in planar orientation. In such an authenticity indicator, the specified light is reflected from the reflective layer by regular reflection (specular reflection, mirror reflection), so that the reflected light can be seen more clearly, which makes it possible to confirm more clearly whether the light reflected from the reflective layer is present or not. Checking of the authenticity indicator for its authenticity can therefore be done more accurately.

Furthermore, in the authenticity indicator of the present invention, the reflective layer may further comprise a transparent part that transmits incident light. Such an authenticity indicator is advantageous in that the light reflected from the reflective layer can be recognized as a pattern that the reflective part forms, which makes it possible to confirm clearly whether the light reflected from the reflective layer is present or not. Checking of the authenticity indicator for its authenticity can therefore be done more accurately. In this case, the reflective layer may comprise an array of reflective parts and an array of transparent parts.

Furthermore, in the authenticity indicator of the present invention, only a part of the reflective part may have the cholesteric liquid crystalline structure in planar orientation. Such an authenticity indicator is advantageous in that the light reflected from the reflective layer can be recognized as a pattern equivalent to the shape of the part of the liquid crystalline structure in the state of planar orientation, which makes it possible to confirm clearly whether the light reflected from the reflective layer is present or not. Checking of the authenticity indicator for its authenticity can therefore be done more accurately.

Furthermore, the authenticity indicator of the present invention may further comprise, as an outermost layer on a backside opposite to a observation side, an attachment layer that makes the authenticity indicator attachable to an object. Such an authenticity indicator can be attached to a variety of objects.

Furthermore, the authenticity indicator of the present invention may further comprise a release member that is laminated to a back surface of the attachment layer and that is separable from the attachment layer. Such an authenticity indicator can be provided as a label, and, moreover, can make it easier to be handled (in the course of distribution, for example).

Furthermore, in the authenticity indicator of the present invention, the diffractive layer may comprise a reflection volume hologram.

BRIEF DESCRIPTION OF THE DRAWINGS

FIGS. 8A to 8C are charts showing a process for producing the authenticity indicator according to Example 1 shown in FIG. 1.

DESCRIPTION OF PREFERRED EMBODIMENT

One embodiment according to the present invention will be described hereinafter with reference to the accompanying drawings.

In this embodiment, an authenticity indicator 101, in the form of a sheet, is configured such that its authenticity can be checked by observing the light reflected from itself. The authenticity indicator 101 comprises a reflective layer 12 comprising a reflective part (also referred to as a reflective area) 12a, and a diffractive layer 15 that comprises a volume hologram and that diffracts a specified light. The reflective part 12a has a cholesteric liquid crystalline structure and reflects a specified light.

Figure 1:
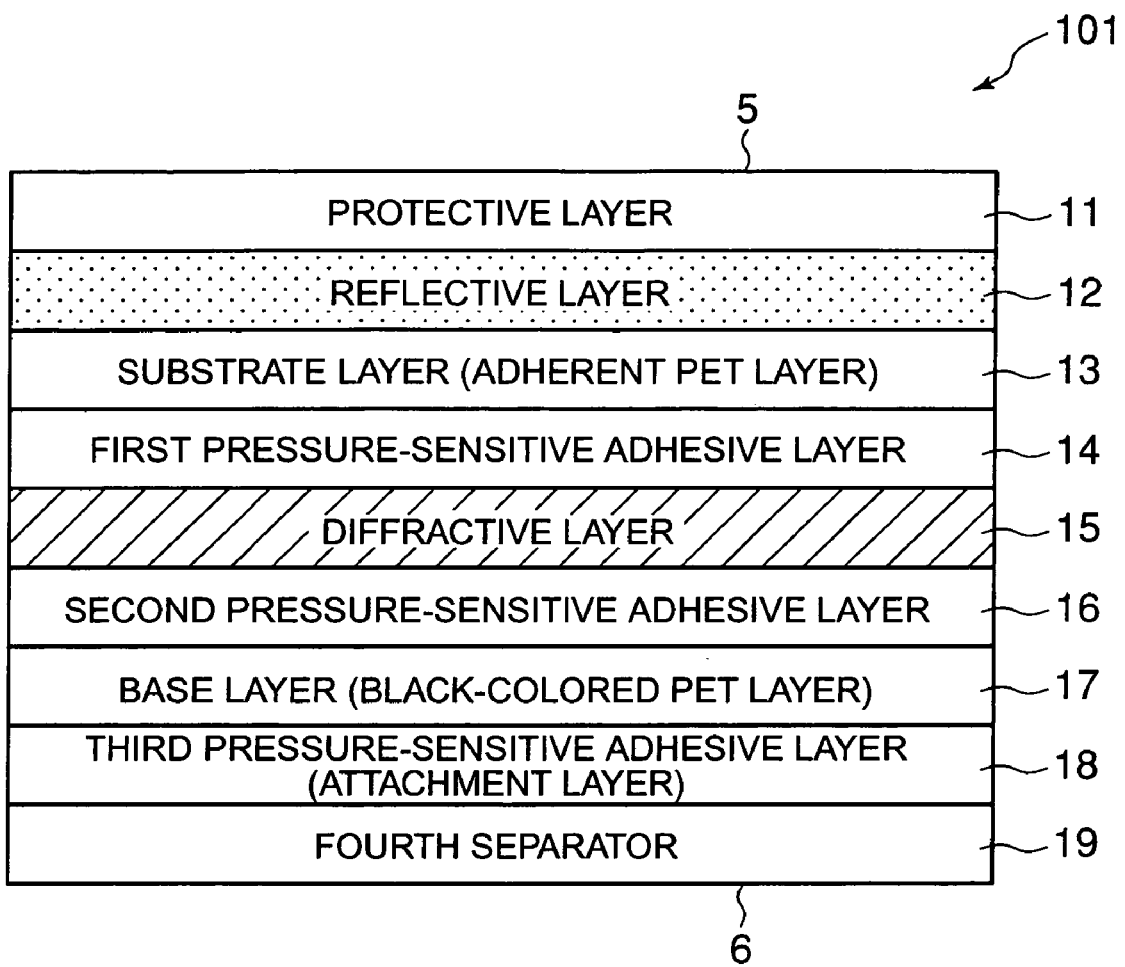
FIG. 1 is a view of a layer construction showing one example of an embodiment of an authenticity indicator according to the present invention.

In the case shown in FIG. 1, the authenticity indicator 101 comprises a protective layer 11, a reflective layer (hereinafter also referred to as a liquid crystalline layer or a cholesteric liquid crystalline layer) 12, a substrate layer (adherent PET layer) 13, a first pressure-sensitive adhesive layer 14, a diffractive layer 15, a second pressure-sensitive adhesive layer 16, a base layer (black-colored PET layer) 17, a third pressure-sensitive adhesive layer (attachment layer) 18, and a fourth separator 19 that are laminated in the order stated, the protective layer 11 being the outermost layer on the observation side 5. In this embodiment, the diffractive layer 15 comprises a Lippmann hologram, which is a reflection volume hologram, so that diffraction caused by the diffractive layer 15 is equal to reflection. In the following description of the embodiment, "reflection" from the diffractive layer 15 is intended to mean "diffraction", unless otherwise noted.

Of the above-described constituent layers, the reflective layer 12 and the diffractive layer (hereinafter also referred to as a Lippmann hologram layer) 15 will now be described. The other constituent layers of the authenticity indicator 101 shown in FIG. 1 will be described later.

First, the reflective layer 12 will be described in detail.

Figure 2:
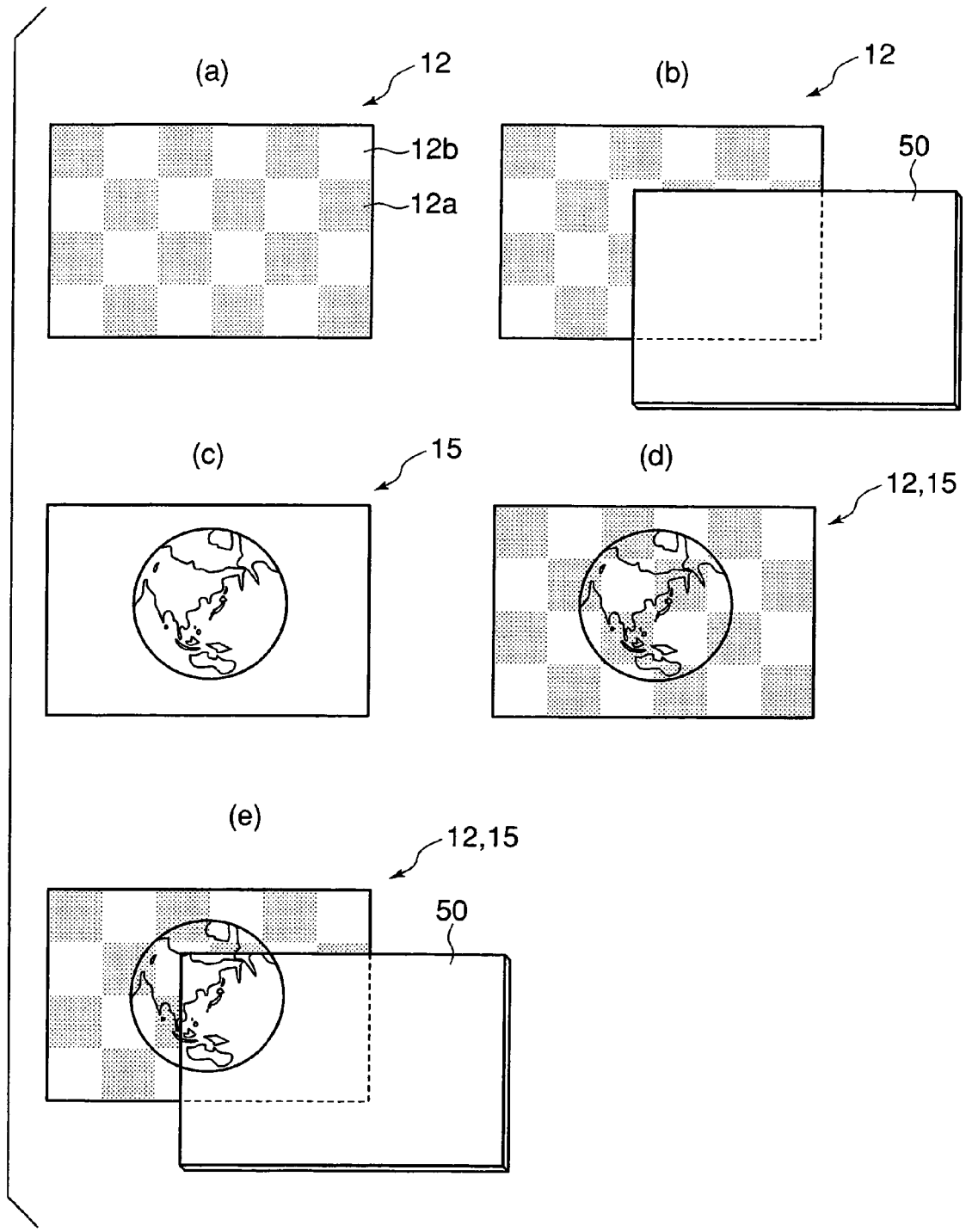
FIG. 2 includes views showing a reflective layer and a diffractive layer as viewed from the observation side.

FIG. 2 includes views showing the reflective layer 12 and the diffractive layer 15 as viewed from the observation side. FIG. 2(a) is a view showing only the reflective layer 12 as viewed from the observation side, FIG. 2(b) is a view showing the reflective layer 12 as viewed partly through a circular polarizer, FIG. 2(c) is a view showing only the diffractive layer as viewed from the observation side, FIG. 2(d) is a view showing a laminate of the reflective layer and the diffractive layer as viewed from the observation side, and FIG. 2(e) is a view showing the laminate of the reflective layer and the diffractive layer as viewed partly through a circular polarizer.

The reflective layer 12 has the cholesteric liquid crystalline structure. Therefore, the reflective layer 12 reflects light in a certain wavelength range, circularly polarized in one direction. On the other hand, the reflective layer 12 transmits light not in the certain wavelength range or light circularly polarized in the opposite direction. This action of the reflective layer 12 is used as a first means of checking the authenticity of the authenticity indicator 101 of this embodiment.

The reflective layer 12 can be formed in a manner that is outlined below. First, a liquid crystal composition capable of forming a cholesteric liquid crystalline layer is applied to a substrate layer (in the case specifically shown in FIG. 1, an adherent layer PET layer) 13, which will be described later, by such a coating method as roll, gravure, or bar coating. The liquid crystalline composition layer is subjected to orientation treatment in order to align cholesteric liquid crystalline molecules to form a cholesteric liquid crystalline structure. This cholesteric liquid crystalline structure is then fixed.

Figure 3A:
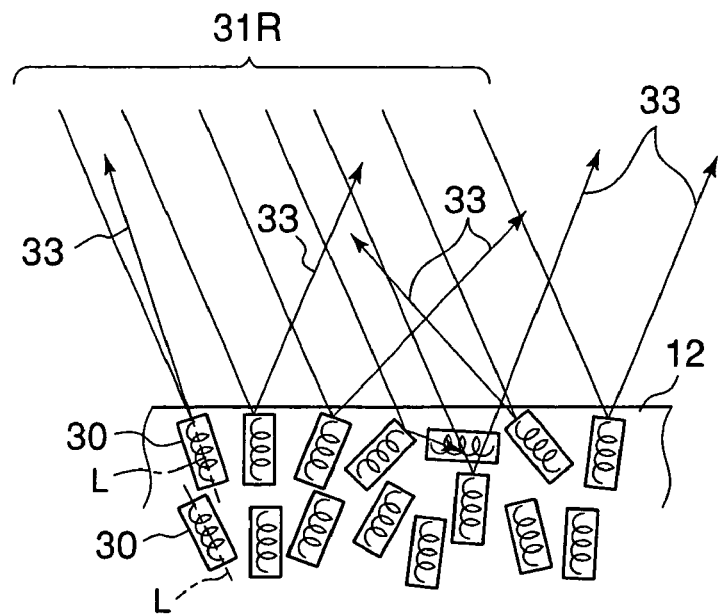
FIG. 3A is a view for explaining a cholesteric liquid crystalline structure.
Figure 3B:
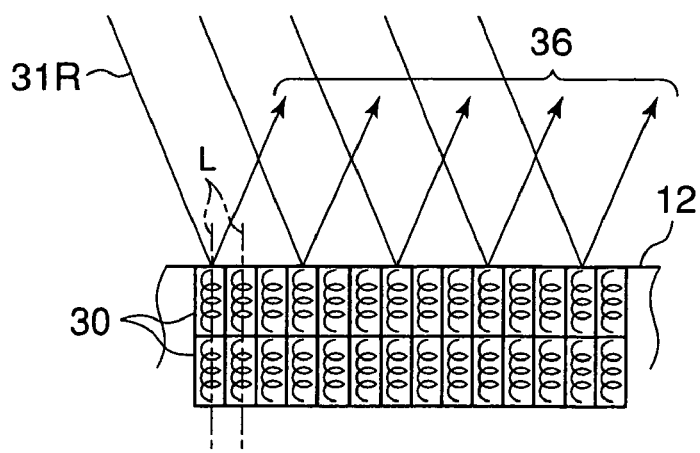
FIG. 3B is a view for explaining a cholesteric liquid crystalline structure.

As shown in FIGS. 3A and 3B, in a cholesteric liquid crystalline structure, liquid crystalline molecules are physically aligned so that the continuous rotation of their directors forms a helical structure. Owing to such a physical orientation of liquid crystalline molecules, the cholesteric liquid crystalline structure (reflective layer 12) has polarized-light-separating properties, the property of separating a component circularly polarized in one direction from a component circularly polarized in the opposite direction. Namely, unpolarized light incident on the reflective layer 12 is split into light in two different states of polarization (right-handed circularly polarized light and left-handed circularly polarized light), and one of these light is reflected and the other transmitted. For this reason, when the reflective layer 12 is formed so that its cholesteric liquid crystalline reflective part 12a reflects only right-handed circularly polarized light, and if this reflective layer 12 is viewed through a circular polarizer 50 or the like capable of transmitting only left-handed circularly polarized light, the light reflected from the reflective layer 12, which can be seen when the reflective layer 12 is viewed without the circular polarizer 50, cannot be seen, as shown in FIG. 2(b).

The following description is based on the assumption that the reflective layer 12 in this embodiment selectively reflects right-handed circularly polarized light and transmits left-handed circularly polarized light.

The above-described phenomenon that only a light component circularly polarized in one direction is reflected is known as circular dichroism. If the direction of helical turn in the helical structure consisting of liquid crystalline molecules is properly selected, a component circularly polarized in the same direction as this direction of helical turn is selectively reflected. In this case, the scattering of polarized light peaks at the wavelength $\lambda_0$ given by the following equation (1):

$$\lambda_0 = nav \cdot p \quad (1)$$

where p is the helical pitch in the helical structure consisting of liquid crystalline molecules (the length of one liquid crystalline molecular helix), and nav is the mean refractive index on a plane perpendicular to the helical axis.

On the other hand, the width $\Delta\lambda$ of the wavelength band of the reflected light is given by the following equation (2):

$$\Delta\lambda = \Delta n \cdot p \quad (2)$$

where $\Delta n$ is the value of birefringence.

Namely, of the unpolarized light incident on the reflective part 12a of the cholesteric liquid crystalline reflective layer 12, a circularly polarized light component (e.g., right-handed circularly polarized light) in a range (selective reflection wavelength range) around the selective reflection center wavelength $\lambda_0$, with the wavelength band width $\Delta\lambda$, is reflected, and the remaining light (e.g., left-handed circularly polarized light, and right-handed circularly polarized light not in the selective reflection wavelength range) is transmitted, owing to the above-described polarized-light-separating properties (polarized-light selectivity).

Therefore, if the wavelength range (selective reflection wavelength range) of the light that the reflective part 12a of the reflective layer 12 reflects is controlled beforehand, the light reflected from the reflective part 12a of the reflective layer 12 can be recognized as the desired color. For example, if the wavelength range corresponding to full width (at) half maximum (FWHM)) of the light that the reflective part 12a of the reflective layer 12 reflects, that is, the wavelength range in which the quantity of light is a half or more of the maximum quantity of light in the quantity distribution, relative to wavelength, of the light reflected from the reflective part 12a of the reflective layer 12, is made from 480 to 540 nm, the light reflected from the reflective part 12a is recognized as green. In another example that the wavelength range in which the quantity of light is a half or more of the maximum quantity of light in the quantity distribution, relative to wavelength, of the light reflected from the reflective part 12a of the reflective layer 12, is made from 605 to 675 nm, the light reflected from the reflective part 12a is recognized as red.

The reflective part 12a of the reflective layer 12 may be uniformly formed on the entire observation-side surface of the substrate layer (adherent PET layer) 13. In this case, the above-described green or red light reflected from the reflective part 12a is two-dimensionally observed.

Alternatively, the reflective part 12a of the reflective layer 12 may be formed only on a part of the observation-side surface of the substrate layer (adherent PET layer) 13, as shown in FIG. 2(a). Such a reflective layer 12 can be formed by partially curing, under different conditions, a liquid crystalline composition applied to a substrate, as is disclosed in the Japanese Patent Laid-Open Publication No. 2004-133179 (the entire contents in this publication are incorporated herein by reference). The reflective layer 12 formed in this manner is composed of a reflective part 12a and a transparent part (also referred to as a transparent area) 12b that transmits incident light (see FIG. 2).

A liquid crystalline composition for forming a reflective part 12a may also be applied only to a part of the substrate layer 13 by a gravure printing machine or the like, thereby forming a reflective layer 12 having a reflective part 12a formed only on a part of the substrate layer 13. In the reflective layer 12 obtained in this manner, the reflective part 12a can be superposed only on a part of the diffractive layer 15.

In the case shown in FIG. 2, the reflective layer 12 contains an array of reflective parts 12a (halftone parts) and an array of transparent parts 12b. The multiple reflective parts 12a form a lattice pattern. In this case, the above-described green or red light reflected from the reflective parts 12a is recognized as the lattice pattern. Namely, the light reflected from the reflective layer 12 is recognized as a pattern formed by the reflective parts 12a. Whether the light reflected from the reflective layer 12 is present or not can therefore be visually confirmed clearly.

In the case where the reflective part 12a is formed only on a part of the substrate layer 13, it is possible to control, as a whole, the reflectance of the reflective layer 12 by changing the area of the reflective part 12a.

The pattern of the reflective layer 12 may be made either macroscopic so that it can be identified as a lattice pattern by visual observation, or microscopic so that it cannot be identified as a lattice pattern by visual observation.

As shown in FIGS. 3A and 3B, a cholesteric liquid crystalline structure includes a plurality of helical structure portions. In the case shown in FIG. 3A, the reflective part 12a of the cholesteric liquid crystalline reflective layer 12 includes a plurality of helical structure portions different in the direction of helical axis. Such a reflective part 12a can diffuse light that is selectively reflected, owing to the structural non-uniformity of the cholesteric liquid crystalline structure.

On the other hand, the cholesteric structure shown in FIG. 3B is in the state of so-called planar orientation; that is, all of the helical axes in the helical structure portions of the cholesteric liquid crystalline structure extend in parallel in the direction of the thickness of the layer. Light to be selectively reflected is reflected from such a reflective part 12a by specular reflection (regular reflection), so that the reflected light can be seen clearly. Further, the reflected light has viewing angle dependency, that is, the reflected light changes in color when an observer changes his viewing angle. Whether the light reflected from the reflective layer 12 is present or not can thus be clearly confirmed.

To form a cholesteric liquid crystalline structure, whether it is of the type shown in FIG. 3A or in FIG. 3B, it is necessary to conduct orientation treatment, as will be described later in detail. By changing the conditions under which the orientation treatment is carried out, only a part of the reflective part 12a of the reflective layer 12 can be made in the state of planar orientation. In this case, of the light reflected from the reflective part 12a of the reflective layer 12, the light reflected from the portion in the state of planar orientation appears brighter. Namely, whether the light reflected from the reflective layer 12 is present or not can be judged by whether a pattern equivalent to the shape of the portion in which liquid crystalline molecules are in the state of planar orientation can be visually observed or not. Whether the light reflected from the reflective layer 12 is present or not can thus be confirmed clearly.

A process for forming the reflective layer 12 will be described below.

A cholesteric chiral nematic liquid crystal or a cholesteric liquid crystal can be used for the liquid crystalline composition to be applied to the substrate layer 13. Any liquid crystalline material can be used as long as it can develop a cholesteric liquid crystalline structure having helical structure portions (see FIGS. 3A and 3B). Particularly, for obtaining an optically stable cured reflective layer 12, it is preferable to use a polymerizable liquid crystalline material having, at both ends of its molecule, polymerizable functional groups.

The following is a case where a chiral nematic liquid crystal is used for the liquid crystalline composition. The chiral nematic liquid crystal is a mixture of a polymerizable, nematic liquid crystalline material and a chiral agent. The chiral agent herein refers to an agent for controlling the helical pitch in the polymerizable, nematic liquid crystalline material and also for making the liquid crystalline composition cholesteric as a whole. By changing the mixture ratio of the nematic liquid crystal and the chiral agent, it is possible to control the helical pitch in the above-described equations (1) and (2). By controlling the helical pitch, it is possible to adjust the selective reflection center wavelength $\lambda_o$ and the wavelength band width $\Delta\lambda$. To the liquid crystalline composition, a photopolymerization initiator and other suitable additives are added.

Examples of polymerizable, nematic liquid crystalline materials include compounds represented by the following general formula (1) or formulas (2-i) to (2-xi). These compounds may be used either singly or in combination.

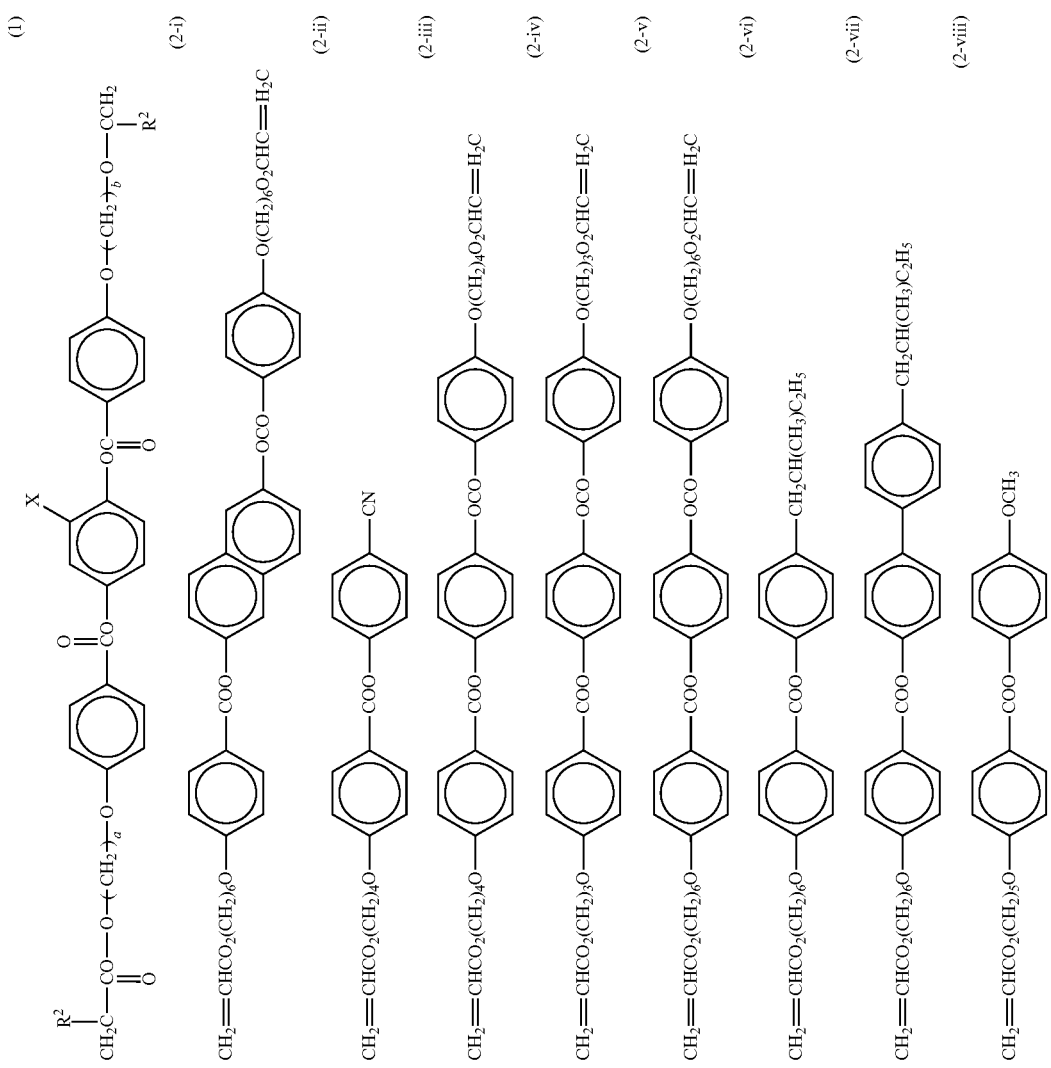

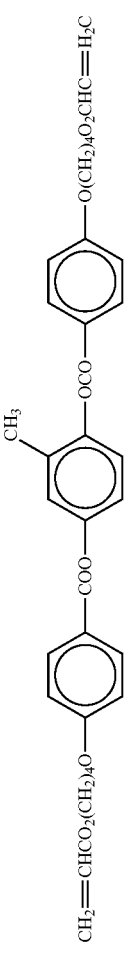
(2-ix)
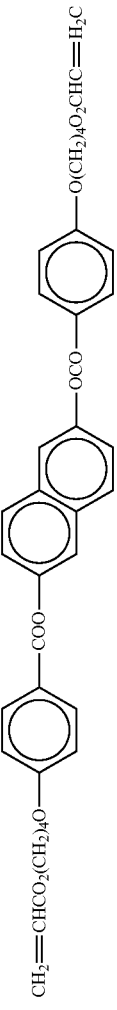
(2-x)
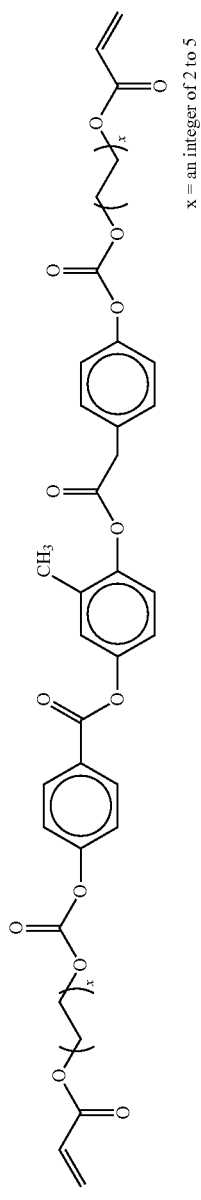
(2-xi)
x = an integer of 2 to 5

In the above general formula (1), R1 and R2 independently represent hydrogen or methyl group. It is preferred that both R1 and R2 be hydrogen because compounds of the general formula (1) in which R1 and R2 represent hydrogen present a liquid crystal phase at temperatures in a wider range. Although X may be any of hydrogen, chlorine, bromine, iodine, an alkyl group having 1 to 4 carbon atoms, methoxy group, cyano group, and nitro group, it is preferably chlorine or methyl group. Further, in the above general formula (1), a and b that denote the chain lengths of the alkylene groups serving as spacers between the (meth)acryloyloxy groups at both ends of the molecule and the aromatic rings are independently an integer of 2 to 12, preferably an integer of 4 to 10, and more preferably an integer of 6 to 9. Compounds of the general formula (1) in which a and b are 0 are unstable, easily undergo hydrolysis, and have high crystallinity. On the other hand, compounds of the general formula (1) in which a and b are independently an integer of 13 or more have low isotropic transition temperatures (TI's). Therefore, the compounds of these two types present liquid crystal phases at temperatures in narrow ranges and are thus undesirable.

Although the polymerizable, nematic liquid crystalline material in the above description is a polymerizable liquid crystal monomer, it may also be a polymerizable liquid crystal oligomer or polymer, a liquid crystal polymer, or the like, which may be suitably selected from conventionally proposed ones.

On the other hand, the chiral agent is a low-molecular weight compound containing an optically active site, and its molecular weight is typically 1,500 or less. The main purpose of the chiral agent is to convert the positive mono-axially-nematic structure of a polymerizable, nematic liquid crystalline material into a helical structure. Any purposive low-molecular weight compound may be used as the chiral agent as long as it is compatible with the polymerizable, nematic liquid crystalline material in the state of solution or melt and can make the liquid crystalline structure of the material helical, as desired, without impairing the liquid crystallinity of the material.

It is essential for the chiral agent that is used for making the structure of a liquid crystal helical to have any type of chirality in its molecule. Examples of chiral agents useful herein include those compounds having one, or two or more asymmetric carbon atoms, those compounds having asymmetric centers on hetero atoms, such as chiral amines or sulfoxides, and those axially chiral compounds having optically active sites, such as cumulene and binaphthol. More specific examples of chiral agents include commercially available chiral nematic liquid crystals (e.g., a chiral dopant liquid crystal "S-811" manufactured by Merck KGaA, Germany).

However, depending on the nature of the chiral agent selected, the following problems can occur: the nematic state of the polymerizable, nematic liquid crystalline material is destroyed, and the polymerizable, nematic liquid crystalline material loses its alignability; and, if the chiral agent is non-polymerizable, the liquid crystalline composition has reduced hardenability, and the cured film is poor in reliability. Moreover, the use of a large amount of a chiral agent having an optically active site increases the cost of the liquid crystalline composition. Therefore, to form a cholesteric, polarized-light selective reflection layer with a short helical pitch, it is preferable to select, as the optically-active-site-containing chiral agent to be incorporated in the liquid crystalline composition, a chiral agent whose helical-structure-developing action is great. Specifically, it is preferable to use any of the compounds represented by the following general formulae (3), (4), and 5, which are low-molecular weight compounds whose molecules are axially chiral.

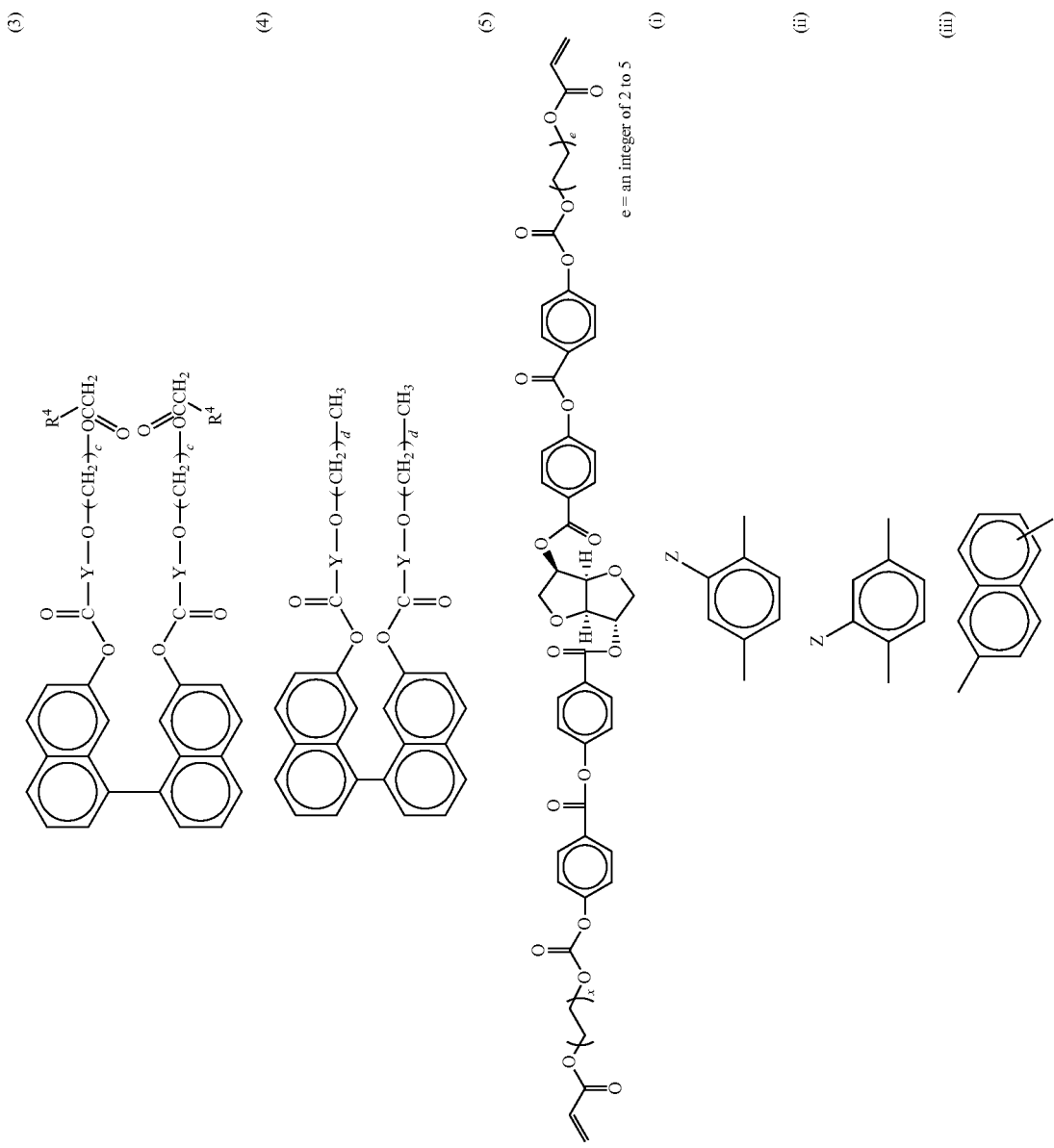

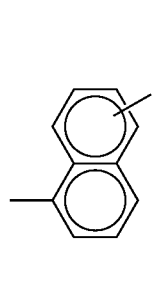 (iv)  (v) 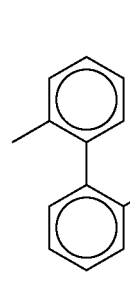 (vi)
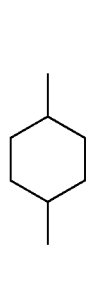 (vii) 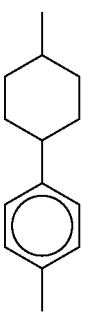 (viii) 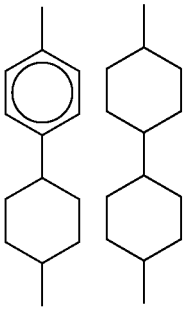 (ix) 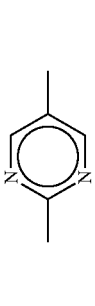 (x)  (xi) (xii)

-continued
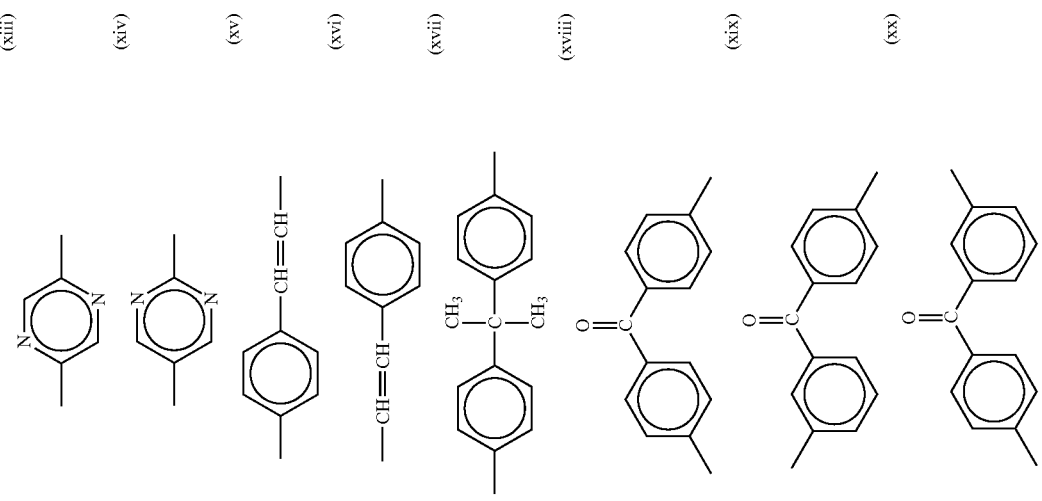

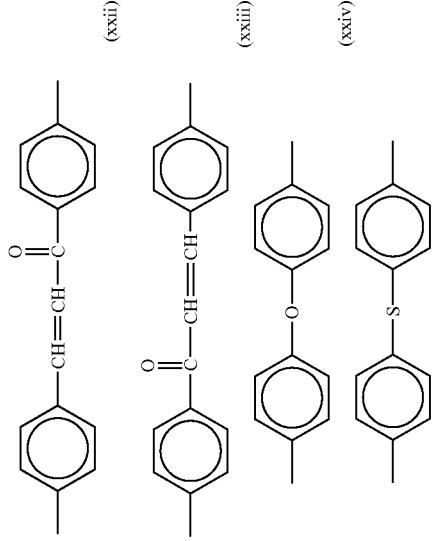

In the above general formulae (3) and (4), R4 represents hydrogen or methyl group; Y is one of the above-enumerated groups (i) to (xxiv), preferably (i), (ii), (iii), (v) or (vii); and c and d that denote the chain lengths of the alkylene groups are independently an integer of 2 to 12, preferably an integer of 4 to 10, more preferably an integer of 6 to 9. Compounds of the above general formula (3) or (4) in which c or d is 0 or 1 are poor in stability, easily undergo hydrolysis, and have high crystallinity. On the other hand, compounds of the general formula (3) or (4) in which c or d is 13 or more have low melting points (Tm's). These compounds are less compatible with the polymerizable, nematic liquid crystalline material, so that a liquid crystalline composition containing such a compound as the chiral agent may cause phase separation depending on the concentration of the compound.

It is not necessary that the chiral agent be polymerizable. However, since a polymerizable chiral agent is polymerized with the polymerizable, nematic liquid crystalline material to stably fix the cholesteric structure, it is highly desirable that the chiral agent be polymerizable when thermal stability, etc. are taken into consideration. Particularly, for obtaining a reflective layer 12 excellent in heat resistance, it is preferable to use a chiral agent having, at both ends of its molecule, polymerizable functional groups.

The content of the chiral agent in the liquid crystalline composition is optimally decided with consideration for the helical-structure-developing ability of the chiral agent, the cholesteric liquid crystalline structure of the reflective layer finally obtained, and so forth. Although the amount of the chiral agent to be added greatly varies depending upon the components of the liquid crystalline composition, it is usually from 0.01 to 60 parts by weight, preferably from 0.1 to 40 parts by weight, more preferably from 0.5 to 30 parts by weight, most preferably from 1 to 20 parts by weight, for 100 parts by weight of the liquid crystalline composition. When the amount of the chiral agent added is less than the above range, there is a possibility that the liquid crystalline composition cannot fully become cholesteric. On the other hand, when the amount of the chiral agent added exceeds the above-described range, the orientation of the liquid crystalline molecules is impeded, which may adversely affect the curing of the liquid crystalline composition in activating radiation or the like.

Although the liquid crystalline composition can be applied as it is to the substrate layer 13, it may be dissolved in a suitable solvent such as an organic solvent to give ink in order to make the viscosity of the liquid crystalline composition fit for an applicator or to achieve excellent orientation of liquid crystalline molecules.

Although any solvent can be used for the above purpose as long as it can dissolve the above-described polymerizable liquid crystalline material, a solvent that does not attack the substrate layer 13 is preferred. Specific examples of solvents useful herein include acetone, 3-methoxy-butyl acetate, diglyme, cyclohexanone, tetrahydrofuran, toluene, xylene, chlorobenzene, methylene chloride, and methyl ethyl ketone. The polymerizable liquid crystalline material may be diluted with the solvent to any degree. However, since a liquid crystal itself is a material having low solubility and high viscosity, it is preferable to dilute the polymerizable liquid crystalline material with the solvent to about 5 to 50%, more preferably about 10 to 30%.

(Step of Orientation)

After applying the liquid crystalline composition to the substrate layer 13 to form thereon a cholesteric liquid crystal layer 12 in the above-described step of application, the cholesteric liquid crystal layer (reflective layer) 12 is held, in the step of orientation, at a predetermined temperature at which the cholesteric liquid crystal layer develops a cholesteric liquid crystalline structure, thereby aligning liquid crystalline molecules in the cholesteric liquid crystal layer 12.

FIGS. 3A and 3B are views for explaining cholesteric liquid crystal structures.

In these figures, light rays 31R are light incident on the reflective layer 12, and light rays 33 in FIG. 3A and light rays 36 in FIG. 3B are light reflected from the reflective layer 12. In FIG. 3A, the directions in which light rays are reflected from the reflective layer 12 are different, while in FIG. 3B, the directions in which the principal rays of the light reflected from the reflective layer 12 are the same.

As mentioned above, the cholesteric liquid crystal structure may be either in such a state of orientation as is shown in FIG. 3A, in which a plurality of the helical structure portions 30 different in the direction of the helical axis L are present, or in such a state of planar orientation as is shown in FIG. 3B. It is necessary to carry out orientation treatment in either case. Namely, in the former case, it is necessary to conduct orientation treatment for producing a plurality of the helical structure portions 30 in the cholesteric liquid crystalline structure, and in the latter case, it is necessary to conduct not only the above orientation treatment but also orientation treatment for directing the directors of the liquid crystalline molecules constituting the cholesteric liquid crystalline structure to a certain direction on the substrate layer 13.

The cholesteric liquid crystal layer (reflective layer) 12 formed on the substrate layer 13 shows a liquid crystal phase when held at a certain temperature at which the cholesteric liquid crystal layer develops a cholesteric liquid crystalline structure. At this time, owing to the self-accumulating action of liquid crystalline molecules themselves, continuous rotation of the directors of the liquid crystalline molecules occurs in the direction of the thickness of the layer, and a helical structure is produced. Further, in the case where the cholesteric liquid crystal layer 12 is made non-diffusive, the directors of liquid crystalline molecules constituting the cholesteric liquid crystal structure are directed to a certain direction on the substrate layer 13. This cholesteric liquid crystalline structure in such a liquid crystal phase state can be fixed by curing the cholesteric liquid crystal layer 12 in such a manner as will be described later.

When the liquid crystalline composition applied to the substrate layer 13 contains a solvent, the step of orientation is usually conducted along with drying treatment for removing the solvent. The drying temperature suitable for removing the solvent is from 40 to 120° C., preferably from 60 to 100° C. Any drying time (heating time) will do as long as a cholesteric liquid crystalline structure is developed and substantially all of the solvent is removed. For example, the drying time is preferably from 15 to 600 seconds, more preferably from 30 to 180 seconds.

After the drying treatment, if it is found that the liquid crystal layer is not satisfactorily orientated, this layer may be heated for a further suitable seconds. If the drying treatment is conducted by vacuum drying, it is preferable to conduct heat treatment separately in order to align liquid crystalline molecules.

(Step of Curing)

After aligning liquid crystalline molecules in the cholesteric liquid crystal layer (reflective layer) 12 in the above-described step of orientation, the cholesteric liquid crystal layer 12 is cured in the step of curing, thereby fixing the cholesteric liquid crystalline structure that is in the state of a crystal phase.

To effect the step of curing, it is possible to employ (1) a method in which the solvent contained in the liquid crystalline composition is dried; (2) a method in which liquid crystalline molecules in the liquid crystalline composition are thermally polymerized; (3) a method in which the liquid crystalline composition is exposed to radiation in order to polymerize liquid crystalline molecules; or (4) any combination of the above methods.

Of the above methods, the method (1) is suitable for the case where a liquid crystal polymer is used as the polymerizable, nematic liquid crystalline material to be incorporated in the liquid crystalline composition for forming the cholesteric liquid crystal layer 12. In this method, the liquid crystal polymer dissolved in such a solvent as an organic solvent is applied to the substrate layer 13, and in this case, a solidified, cholesteric liquid crystal layer 12 can be obtained by merely removing the solvent by drying. The type of the solvent, the drying conditions, etc. are the same as those in the aforementioned steps of application and orientation.

The above-described method (2) is for curing the cholesteric liquid crystal layer 12 by thermally polymerizing liquid crystalline molecules in the liquid crystalline composition by heating. In this method, the state of bonding of the liquid crystalline molecules varies according to heating (baking) temperature. Therefore, if the heating temperature is non-uniform in the cholesteric liquid crystal layer 12 plane, the cured layer cannot be uniform in physical properties such as film hardness and also in optical properties. In order to limit variations in film hardness to ±10%, it is preferable to control the heating temperature so that it varies only within ±5%, more preferably ±2%.

Any method can be employed to heat the cholesteric liquid crystal layer 12 formed on the substrate layer 13 as long as it can make the heating temperature uniform, and there may be employed, for example, a method in which the liquid crystal layer 12 is placed directly on a hot plate and held as it is, or indirectly on a hot plate with a thin air layer between the liquid crystal layer and the hot plate. Besides, a method using a heater capable of entirely heating a particular space, such as an oven, may be employed. In this case, the liquid crystal layer is placed in or passed through such a heater. If a film coater or the like is used, it is preferable to make the drying zone long enough to make the heating time sufficiently long.

The heating temperature required is usually as high as 100° C. or more. It is however preferable to limit this temperature to below 150° C. if the heat resistance of the substrate layer 13 is taken into account. If a special film or the like having significantly high heat resistance is used as the substrate layer 13, it may be heated to a temperature as high as above 150° C.

The above-described method (3) is for curing the cholesteric liquid crystal layer 12 by applying radiation to cause photo-polymerization of liquid crystalline molecules in the liquid crystalline composition. In this method, an electron beam, ultraviolet light, or the like suitable for the conditions can be used as the radiation. In general, ultraviolet light is preferred because of the simplicity of an ultraviolet light irradiation system, and so forth, and its wavelength is from 250 to 400 nm. If ultraviolet light is used, it is preferable to incorporate a photopolymerization initiator in the liquid crystalline composition in advance.

Examples of photopolymerization initiators that can be incorporated in the liquid crystalline composition include benzyl (bibenzoyl), benzoin isobutyl ether, benzoin isopropyl ether, benzophenone, benzoyl benzoic acid, benzoyl methylbenzoate, 4-benzoyl-4'-methyidiphenylsulfide, benzylmethyl ketal, dimethylamino-methyl benzoate, 2-n-butoxyethyl-4-dimethylaminobenzoate, isoamyl p-dimethylaminobenzoate, 3,3'-dimethyl-4-methoxybenzophenone, methyl-benzoyl formate, 2-methyl-1-(4-(methylthio)phenyl)-2-morpholinopropan-1-one, 2-benzyl-2-dimethylamino-1-(4-morpholinopheyl)-butan-1-one, 1-(4-dodecylphenyl)-2-hydroxy-2-methylpropan-1-one, 1-hydroxycyclo-hexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. In addition to photopolymerization initiators, sensitizers may be added to the liquid crystalline composition unless they impair the properties required for the cholesteric liquid crystal layer 12.

The amount of the photopolymerization initiator to be added to the liquid crystalline composition is from 0.01 to 20% by weight, preferably from 0.1 to 10% by weight, more preferably from 0.5 to 5% by weight, of the liquid crystalline composition.

By effecting a series of the above-described steps (steps of application, orientation, curing), it is possible to laminate (adhere) the reflective layer 12 (strictly, the reflective part 12a of the reflective layer 12) to the substrate layer 13.

The diffractive layer 15 will be described hereinafter in detail.

In this embodiment, the diffractive layer 15 is a reflection volume hologram layer in which interference fringes are recorded. The diffractive layer 15 therefore reflects (diffracts) light in a specified wavelength range, entering the diffractive layer 15 at a certain angle of incidence. A second means of checking the authenticity of the authenticity indicator 101 of this embodiment uses this action of the diffractive layer 15.

In this embodiment, an image has been recorded in the volume hologram constituting the diffractive layer 15, as shown in FIGS. 2(c), 2(d), and 2(e). The image can therefore be seen as the light reflected from the diffractive layer 15 (diffracted light). The image reconstructed from the diffractive layer 15 changes when an observer moves his viewing angle in two directions, up and down, and right and left. Reconstruction of a three-dimensional image can thus be achieved.

Next, a process for forming the diffractive layer 15 will be described below in detail. First of all, materials useful for forming the volume hologram layer will be described.

Conventionally known volume holographic materials can be used herein. Specific examples of such holographic materials include silver halide sensitive materials, dichromated gelatin, photo-crosslinkable polymers, and photopolymers. Of these, photopolymers are superior in mass productivity to other materials, because volume holograms can be recorded in photopolymers only by a dry process. In this embodiment, a photopolymer having at least one photopolymerizable compound and a photopolymerization initiator is used as the holographic material. The components of such a volume holographic photopolymer will be described below.

(1. Photopolymerizable Compound)

Photopolymerizable compounds useful in this embodiment will be described below. Both radically photopolymerizable compounds and cationically photopolymerizable compounds can be used as photopolymerizable compounds in this embodiment. Explanation of radically photopolymerizable compounds and that of cationically photopolymerizable compounds will be given below separately.

(a. Radically Photopolymerizable Compound)

In this embodiment, any compound can be used as the radically photopolymerizable compound as long as it is polymerized due to the action of an active radical released from a radical photopolymerization initiator, which will be described later, when laser light or the like is applied in the course of preparation of a volume hologram using a volume-hologram-layer-forming resin composition of the present invention, and those compounds that have at least one addition-polymerizable, ethylenically unsaturated double bond are herein useful. Examples of such compounds include unsaturated carboxylic acids, unsaturated carboxylates, esters of unsaturated carboxylic acids and aliphatic polyhydric alcohol compounds, and amide-combined products obtained from unsaturated carboxylic acids and aliphatic polyvalent amine compounds. The following are specific examples of the above-described esters of unsaturated carboxylic acids and aliphatic polyhydric alcohol compounds.

Examples of acrylic esters include ethylene glycol diacrylate, triethylene glycol diacrylate, 1,3-butanediol diacrylate, tetramethylene glycol diacrylate, propylene glycol diacrylate, neopentyl glycol diacrylate, trimethylol propane triacrylate, trimethylol propane tri(acryloyloxypropyl) ether, trimethylol ethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomers, 2-phenoxyethylacrylate, phenol ethoxylate monoacrylate, 2-(p-chlorophenoxy)ethyl acrylate, p-chlorophenyl acrylate, phenyl acrylate, 2-phenylethylacrylate, (2-acryloxyethyl)ether of bisphenol A, ethoxylated bisphenol A diacrylate, 2-(1-naphthyloxy)ethyl acrylate, o-biphenyl acrylate, 9,9-bis(4-acryloxydiethoxyphenyl)fluorene, 9,9-bis(4-acryloxytriethoxyphenyl)fluorene, 9,9-bis(4-acryloxydipropoxyphenyl)fluorene, 9,9-bis(4-acryloxyethoxy-3-methylphenyl)fluorene, 9,9-bis(4-acryloxyethoxy-3-ethylphenyl)fluorene, and 9,9-bis(4-acryloxyethoxy-3,5-dimethyl)fluorene.

Sulfur-containing acrylic compounds may also be used. Examples of such compounds include 4,4'-bis(β-acryloyloxyethylthio)-diphenyl sulfone, 4,4'-bis(β-acryloyloxyethylthio)diphenyl ketone, 4,4'-bis(β-acryloyloxyethylthio)-3,3',5,5'-tetrabromodiphenyl ketone, and 2,4-bis(O-acryloyloxyethylthio)diphenyl ketone.

Examples of methacrylic esters include those compounds which "acrylate", "acryloxy", and "acryloyl" in the above-enumerated compounds as examples of acrylic esters are replaced with "methacrylate", "methacryloxy", and "methacryloyl", respectively.

The radically photopolymerizable compounds described above can be used singly. Alternatively, two or more of the compounds may be used in combination.

(b. Cationically Photopolymerizable Compound)

Cationically photopolymerizable compounds useful in this embodiment are those compounds that are cationically polymerized due to the action of Bronsted or Lewis acids that cationic photopolymerization initiators, which will be described later, liberate when they decompose. Examples of such compounds include cyclic ethers having such rings as epoxy or oxetane ring, thioethers, and vinyl ethers.

Examples of the above-described cyclic compounds containing epoxy ring include polyalkylene glycol diglycidyl ethers, bisphenol A diglycidyl ether, glycerin triglycidyl ether, diglycerol triglycidyl ether, diglycidyl hexahydrophthalate, trimethyloylpropane diglycidyl ether, allyl glycidyl ether, phenyl glycidyl ether, and cyclohexene oxide.

The above cationically photopolymerizable compounds can be used singly. Alternatively, two or more of the compounds may be used in combination.

Further, one of, or two or more of the above-described radically photopolymerizable compounds may be used in combination with one of, or two or more of the above-described cationically photopolymerizable compounds.

Using the above-described volume-hologram-layer-forming resin composition, a volume hologram can be prepared in the following manner. For example, laser light is first applied objective-image-wise to the volume-hologram-layer-forming resin composition to polymerize the radically photopolymerizable compound contained therein. Energy is then applied to the entire surface of the volume-hologram-layer-forming resin composition to polymerize the uncured materials such as a cationically photopolymerizable compound, thereby preparing a volume hologram. In general, the wavelength of the laser light or the like to be applied to form the image is different from the wavelength of the energy to be applied to the entire surface of the resin composition. It is preferred that the cationically photopolymerizable compound for use in this embodiment be not polymerized when the laser light or the like to be used for forming the image is applied.

Preferably, such a cationically photopolymerizable compound is liquid at normal temperatures. This is because it is preferred that the polymerization of the radically polymerizable compound be conducted in a composition having relatively low viscosity.

(c. Others)

In this embodiment, it is preferable to use the photopolymerizable compound in an amount of 10 to 1,000 parts by weight, preferably 10 to 300 parts by weight, for 100 parts by weight of a binder resin that will be described later. A volume hologram is interference fringes formed by polymerizing a photopolymerizable compound using laser light, coherent light, or the like, and an image is reconstructed from it. Therefore, when the volume-hologram-layer-forming resin composition contains both a radically photopolymerizable compound and a cationically photopolymerizable compound, the two compounds are needed to be different in refractive index, and the refractive index of the radically photopolymerizable compound may be either greater or smaller than that of the cationically photopolymerizable compound. From the viewpoint of material selectivity, it is preferred in this embodiment that the mean refractive index of the radically photopolymerizable compound be greater than that of the cationically photopolymerizable compound. Specifically, it is preferred that the mean refractive index of the radically photopolymerizable compound be greater than that of the cationically photopolymerizable compound by 0.02 or more.

This is because when the difference between the mean refractive index of the radically photopolymerizable compound and that of the cationically photopolymerizable compound is less than 0.02, refractive index modulation is poor, which can make it difficult to reconstruct an extremely fine image. The mean refractive index herein refers to a mean value of measurements of the refractive index of a polymer of a cationically or radically polymerizable compound. The refractive index is a value measured with an Abbe refractometer.

(2. Photopolymerization Initiator)

Next, photopolymerization initiators useful in this embodiment will be described. The type of the photopolymerization initiator to be used in this embodiment varies depending on the above-described photopolymerizable compound used. Namely, when a radically photopolymerizable compound is used as the photopolymerizable compound, it is necessary to select a radical photopolymerization initiator for the photopolymerization initiator, and when a cationically photopolymerizable compound is used as the photopolymerizable compound, it is necessary to select a cationic photopolymerization initiator for the photopolymerization initiator. The radical photopolymerization initiator and the cationic photopolymerization initiator will be described below separately.

(a. Radical Photopolymerization Initiator)

In this embodiment, any initiator can be used as the radical photopolymerization initiator as long as it releases an active radical when exposed to laser light or the like in the course of the formation of a volume hologram layer using the volume-hologram-layer-forming resin composition and can thus cause the polymerization of the radically polymerizable compound. Examples of such radical photopolymerization initiators include imidazole derivatives, bisimidazole derivatives, N-arylglycine derivatives, organic azide compounds, titanocenes, aluminate complexes, organic peroxides, N-alkoxypyridinium salts, and thioxantone derivatives. Specific examples of these initiators include 1,3-di(t-butyidioxycarbonyl)benzophenone, 3,3',4,4'-tetrakis(t-butyldioxycarbonyl)benzophenone, 3-phenyl-5-isooxazolone, 2-mercaptobenzimidazole, bis(2,4,5-triphenyl)imidazole, 2,2-dimethoxy-1,2-diphenylethan-1-one (trade name "Irgacure 651" available from Ciba Specialty Chemicals K.K., Japan), 1-hydroxy-cyclohexyl-phenyl ketone (trade name "Irgacure 184" available from Ciba Specialty Chemicals K.K., Japan), 2-benzyl-2-dimethylamino-1-(4-morpholinophenyl)-butanone-1 (trade name "Irgacure 369" available from Ciba Specialty Chemicals K.K., Japan), and bis($\eta$5-2,4-cyclopentadien-1-yl)-bis(2,6-difluoro-3-(1H-pyrrol-1-yl)-phenyl)titanium (trade name "Irgacure 784" available from Ciba Specialty Chemicals K.K., Japan).

(b. Cationic Photopolymerization Initiator)

In this embodiment, any initiator can be used as the cationic photopolymerization initiator as long as it liberates Bronsted or Lewis acid, when energy is applied, to cause the polymerization of the above cationically photopolymerizable compound. When the volume-hologram-layer-forming resin composition contains both a radically photopolymerizable compound and a cationically photopolymerizable compound, it is preferred that the cationically photopolymerizable compound does not react to laser light, coherent light, or the like that causes the polymerization of the above-described radically polymerizable compound, but reacts when energy is applied to the entire surface of the resin composition after polymerizing the radically polymerizable compound. This is because such a cationically photopolymerizable compound remains practically unreacted while the radically photopolymerizable compound is polymerized, and this makes the volume hologram finally prepared excellent in refractive index modulation.

Specific examples of cationic photopolymerization initiators useful herein include sulfonic esters, sulfonimides, dialkyl-4-hydroxy sulfonium salts, p-nitrobenzyl arylsulfonates, silanol-aluminum complexes, and ($\eta$6-benzene)($\eta$5-cyclopentadienyl)iron(II). In addition, benzoin tosylate, 2,5-dinitrobenzyltosylate, N-tosyphthalimide, etc. can also be used.

(c. Others)

In this embodiment, aromatic iodonium salts, aromatic sulfonium salts, aromatic diazonium salts, aromatic phosphonium salts, triazine compounds, iron-arene complexes, and the like can be used as both the radical photopolymerization initiator and the cationic photopolymerization initiator. Specific examples of these compounds include chlorides or bromides of iodonium such as diphenyl iodonium, ditolyl iodonium, bis(p-t-butylphenyl)iodonium, and bis(p-chlorophenyl)iodonium, iodonium salts of borofluorides, hexafluorophosphates, and hexafluoroantimonates, chlorides or bromides of sulfonium such as triphenylsulfonium, 4-t-butyltriphenylsulfonium, and tris(4-methylphenyl)sulfonium, sulfonium salts of borofluorides, hexafluorophosphates, and hexafluoroantimonates, and 2,4,6-substituted-1,3,5-triazine compounds such as 2,4,6-tris(trichloromethyl)-1,3-5-triazine, 2-phenyl-4,6-bis(trichloromethyl)-1,3,5-triazine, and 2-methyl-4,6-bis(trichloromethyl)-1,3,5-triazine. The above-enumerated photopolymerization initiators can be used singly. Alternatively, two or more of the photopolymerization initiators may be used in combination. The photopolymerization initiator is used in an amount of 0.1 to 20 parts by weight, preferably from 5 to 15 parts by weight, for 100 parts by weight of a binder resin that will be described later.

(3. Additives)

Additives that can be added to the volume-hologram-layer-forming resin composition of this embodiment will be described below.

(a. Sensitizing Dye)

In this embodiment, it is preferred that the volume-hologram-layer-forming resin composition contains a sensitizing dye. The reason for this is as follows: many of the above photopolymerizable compounds and photopolymerization initiators are active in ultraviolet light, and they become active also in visible light if sensitizing dyes are added to them, which makes it possible to record interference fringes using visible laser light. Although it is necessary to select a sensitizing dye fit for the wavelength of laser light to be used to record interference fringes, any sensitizing dye can be used. Examples of sensitizing dyes useful herein include thiopyrylium salt dyes, merocyanine dyes, quinoline dyes, styryl quinoline dyes, coumarin dyes, ketocoumarin dyes, thioxanthene dyes, xanthene dyes, oxonol dyes, cyanine dyes, rhodamine dyes, pyrylium dyes, cyclopentanone dyes, and cyclohexanone dyes.

Specific examples of the above cyanine dyes and merocyanine dyes include 3,3'-dicarboxyethyl-2,2'-thiocyanine bromide, 1-carboxymethyl-1'-carboxyethyl-2,2'-quinocyanine bromide, 1,3'-diethyl-2,2'-quinothiacyanine iodide, and 3-ethyl-5-[(3-ethyl-2(3H)-benzo-thiazolidene)ethylidene]-2-thio xo-4-oxazolidine. Specific examples of the above coumarin dyes and ketocoumarin dyes include 3-(2'-benzoimidazol) 7-N,N-diethylaminocoumarin, 3,3'-carbonylbis(7-diethylaminocoumarin), 3,3'-carbonylbiscoumarin, 3,3'-carbonylbis(5,7-dimethoxycoumarin), and 3,3'-carbonylbis(7-acetoxycoumarin).

In the case where the diffractive layer 15, volume hologram layer, is formed on the observation side of the reflective layer 12, high transparency is required for this diffractive layer 15. Therefore, in this case, the sensitizing dye having an absorption wavelength in the visible light range is preferably one that becomes colorless when exposed to heat or ultraviolet light and decomposes in the steps after the step of recording interference fringes. The above-described cyanine dyes are favorably used herein as such sensitizing dyes. The sensitizing dye is used in an amount of 0.01 to 10 parts by weight, preferably 0.01 to 2 parts by weight, for 100 parts by weight of a binder resin that will be described later.

(b. Binder Resin)

In this embodiment, it is preferred that a binder resin be contained in the volume-hologram-layer-forming resin composition. By incorporating a binder resin, there can be obtained a volume-hologram-layer-forming resin composition having improved film-forming properties, capable of forming a layer more uniform in thickness, and a layer of such a resin composition can stably retain interference fringes recorded in it.

Examples of such binder resins include polymethacrylate, partially hydrolyzed polymethacrylate, polyvinyl acetate, partially hydrolyzed polyvinyl acetate, polyvinyl alcohol, partially acetalized polyvinyl alcohol, triacetyl cellulose, polyisoprene, polybutadiene, polychloroprene, silicone rubber, polystyrene, polyvinyl butyral, polyvinyl chloride, polyallylate, chlorinated polyethylene, chlorinated polypropylene, poly-N-vinylcarbazole or derivatives thereof, poly-N-vinylpyrrolidone or derivatives thereof, and copolymers of styrene and maleic anhydride or semi-esters thereof. In addition, it is also possible to use copolymers obtained by polymerizing one or more copolymerizable monomers selected from the group consisting of acrylic acid, acrylic esters, methacrylic acid, methacrylic esters, acrylamide, acrylonitrile, ethylene, propylene, vinyl chloride, and vinyl acetate. Further, there may also be used copolymers obtained by polymerizing monomers having, in side chains, thermosetting or photosetting functional groups. The above-described materials can be used singly. Alternatively, a mixture of two or more of the above materials may also be used.

Curable oligomeric resins can also be used for the binder resin. Examples of such resins useful herein include epoxy compounds obtained by condensation reaction of a variety of phenolic compounds, such as bisphenol A, bisphenol S, novolak, o-cresol novolak, and p-alkylphenol novolak, with epichlorohydrin. For the binder resin, it is also possible to use organic-inorganic hybrid polymers obtained by sol-gel reaction. Examples of such polymers include copolymers of organometallic compounds having polymerizable groups, represented by the following general formula (6), and vinyl monomers:

$$R_m M(OR')_n \qquad (6)$$

where M is such a metal as Si, Ti, Zr, Zn, In, Sn, Al, or Se, R is a vinyl group having 1 to 10 carbon atoms or (meth)acryloyl group, R' is an alkyl group having 1 to 10 carbon atoms, and m+n shows the valence of the metal M.

Examples of organometallic compounds represented by the general formula (6) in which the metal M is Si include vinyltriethoxysilane, vinyltrimethoxysilane, vinyltributoxysilane, vinyltriallyloxysilane, vinyltetraethoxysilane, vinyltetramethoxysilane, acryloxypropyl-trimethoxysilane, and methacryloxypropyltrimethoxysilane.

Examples of the above-described vinyl monomers include acrylic acid, acrylic esters, methacrylic acid, and methacrylic esters.

A volume hologram is prepared by recording interference fringes so that they undergo refractive index or transmittance modulation. It is, therefore, preferred that the difference between the refractive index of the binder resin and that of the photopolymerizable compound be great. In this embodiment, to make the difference in refractive index between the binder resin and the photopolymerizable compound great, an organometallic compound represented by the following general formula (7) may be added to the volume-hologram-layer-forming resin composition:

$$M(OR'')_k \qquad (7)$$

where M is such a metal as Ti, Zr, Zn, In, Sn, Al, or Se, R'' is an alkyl group having 1 to 10 carbon atoms, and k denotes the valence of the metal M.

If a compound represented by the above general formula (7) is incorporated in the volume-hologram-layer-forming resin composition, it causes sol-gel reaction in the presence of water and an acid catalyst to form a network structure together with the binder resin. Thus, the compound (7) acts not only to increase the refractive index of the binder resin but also to provide a film of the resin composition with improved toughness and heat resistance. Therefore, for making the difference in refractive index between the resin binder and the photopolymerizable compound great, it is preferable to use, as the metal M, a high-refractive-index metal. The binder resin is used in an amount of generally 15 to 50% by weight, preferably 20 to 40% by weight, of the volume-hologram-layer-forming resin composition.

Next, the formation of a volume hologram layer will be described.

A volume hologram layer is formed in the following manner: the above-described volume-hologram-layer-forming resin composition is first applied, for example, to a substrate film by a conventional coating method, and is dried, if necessary, to form a volume holographic layer. Alternatively, a volume holographic layer may be formed by pouring the volume-hologram-layer-forming resin composition in a space between two substrates such as glass plates. Thereafter, by exposing the volume holographic layer to laser light (coherent light (e.g., light having a wavelength of 300 to 1200 nm)) that is usually used for a holographic exposure system, the above-described photopolymerizable compound is polymerized, thereby recording, in the holographic layer, the interference fringes of an objective image. There is thus formed a volume hologram layer.

A solvent may be added, if necessary, to the above-described volume-hologram-layer-forming resin composition when the composition is applied to the substrate film. Examples of solvents useful herein include acetone, methyl ethyl ketone, methyl isobutyl ketone, cyclohexanone, benzene, toluene, xylene, chlorobenzene, tetrahydrofuran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol, and isopropanol. These solvents may be used either singly or as a mixture of two or more members. To apply the volume-hologram-layer-forming resin composition to the substrate film, such a coating method as spin, gravure, comma, or bar coating can be employed.

The amount of the above-described volume-hologram-layer-forming resin composition is suitably selected depending on the use or type of the volume hologram layer, and it is typically from 1 to 100 g/m$^2$, preferably from 2 to 40 g/m$^2$. It is preferred that the thickness of the volume holographic layer be generally from 1 to 100 μm, particularly from 2 to 40 μm. Further, it is preferred that the thickness of the volume hologram layer that is formed by curing the volume-hologram-layer-forming resin composition be generally from 1 to 100 μm, particularly from 10 to 40 μm.

The interference fringes of an objective image are recorded in the above-described volume holographic layer by polymerizing the above photopolymerizable compound by exposing the layer to laser light (coherent light (e.g., light with a wavelength of 300 to 1200 nm)) that is usually used in a holographic exposure system. Examples of the laser light include visible laser light such as argon ion laser light (458 nm, 488 nm, 514.5 nm), krypton ion laser light (647.1 nm), helium-neon laser light (633 nm), and YAG laser light (532 nm).

A conventional method can be employed to record the interference fringes of an objective image. For example, the above-described volume holographic layer is brought into close contact with a master plate, and visible light or ionizing radiation such as ultraviolet light or an electron beam is applied to the holographic layer from the substrate film side to effect interference exposure, thereby recording the interference fringes of the image in the holographic layer. Further, in order to promote the refractive index modulation and complete the polymerization reaction of the photopolymerizable compound, the entire surface of the holographic layer may be exposed to ultraviolet light, or subjected to heat treatment or the like, as needed, after the interference exposure.

The diffractive layer 15, volume hologram layer, formed in the above-described manner diffracts only light in a specified wavelength range. By controlling the wavelength of the light to be used for recording the interference fringes, it is possible to control the wavelength range of the light that the diffractive layer 15 reflects. Therefore, by controlling the wavelength range (selective reflection wavelength range) of the light that the diffractive layer (transmission volume hologram layer) 15 reflects (diffracts), an image in the desired color can be reconstructed from the diffractive layer 15. For example, when the wavelength range corresponding to the full width half maximum of the light that the diffractive layer 15 reflects, in other words, the wavelength range in which the quantity of light is equal to a half or more of the maximum quantity of light in the quantity distribution, relative to wavelength, of the light reflected from (diffracted by) the diffractive layer 15, is made from 520 to 540 nm, the light reflected from the diffractive layer 15 is recognized as a green image.

The relationship between the wavelength range of the light that the diffractive layer 15 diffracts and the wavelength range of the light that the previously mentioned reflective layer 12 reflects will now be described.

Figure 4:
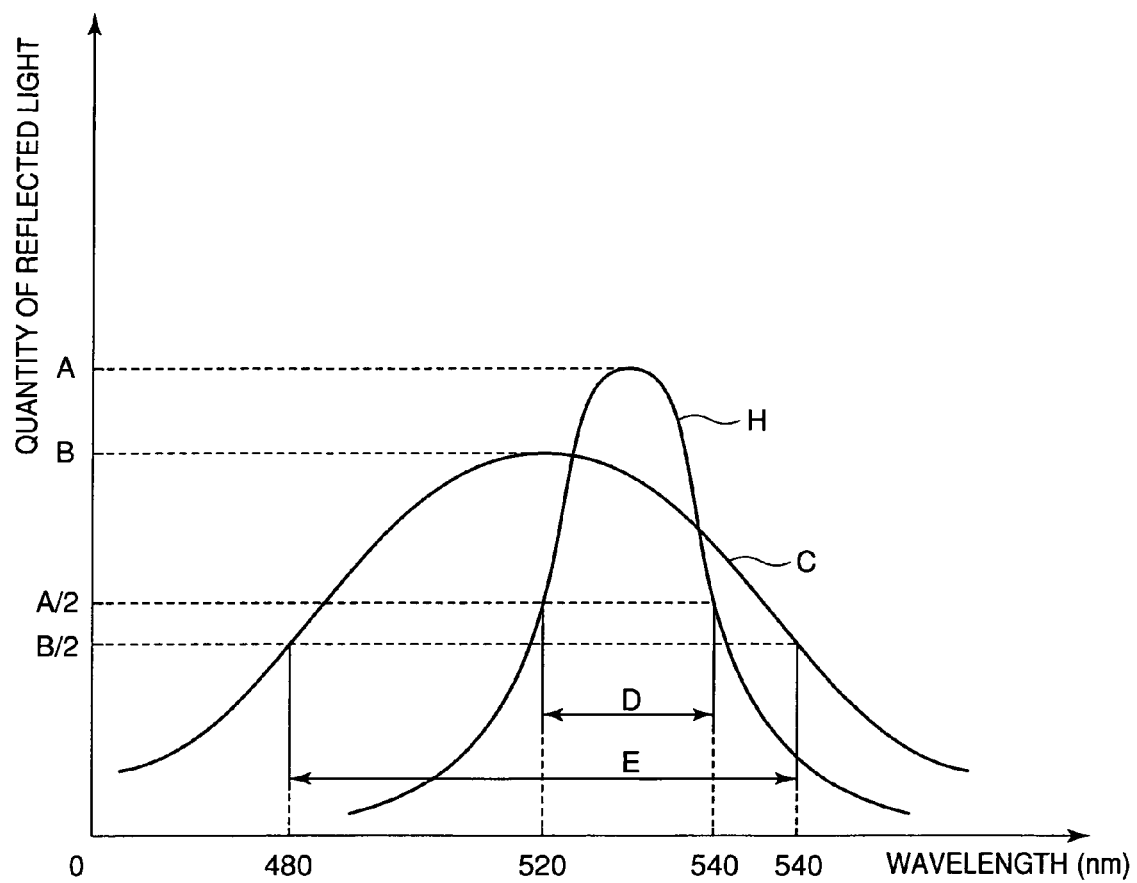
FIG. 4 is a diagram showing an example of a quantity distribution, relative to wavelength, of the light reflected from a reflective layer, and a quantity distribution, relative to wavelength, of the light reflected from a diffractive layer.
Figure 5:
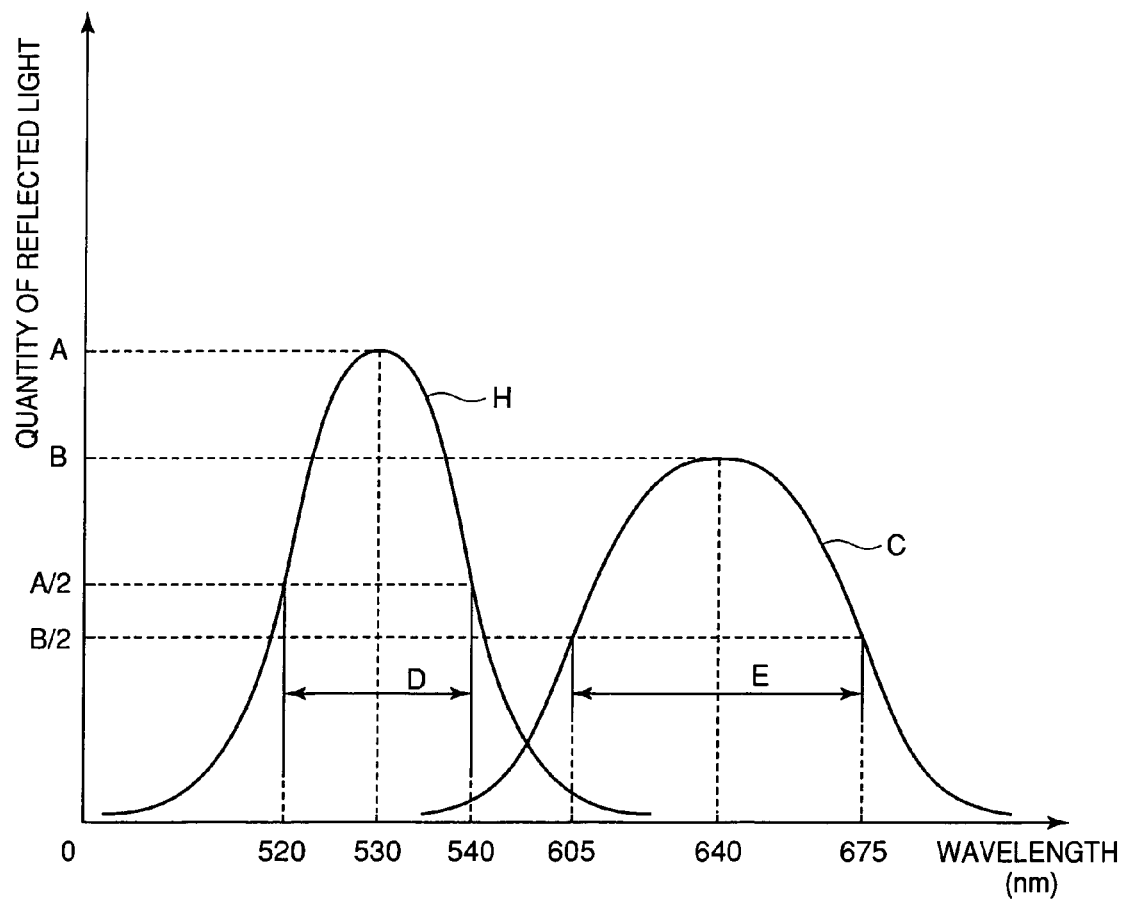
FIG. 5 is a diagram showing another example of the quantity distribution, relative to wavelength, of the light reflected from a reflective layer, and the quantity distribution, relative to wavelength, of the light reflected from a diffractive layer.
Figure 6:
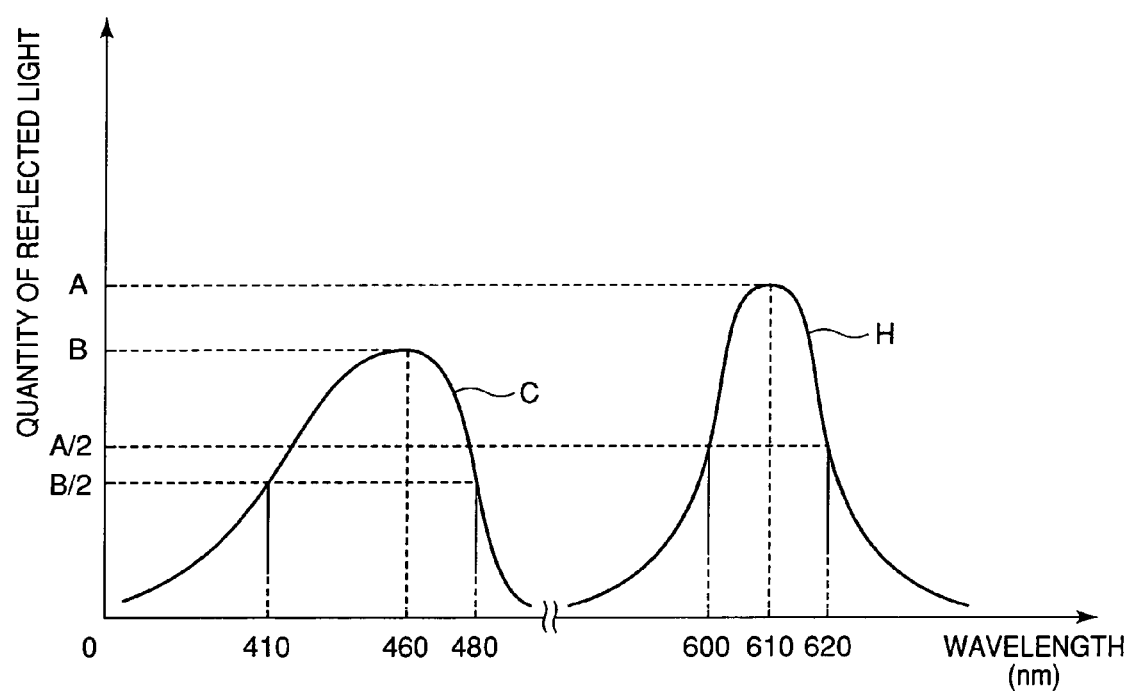
FIG. 6 is a view showing a still another example of the quantity distribution, relative to wavelength, of the light reflected from a reflective layer, and the quantity distribution, relative to wavelength, of the light reflected from a diffractive layer.

FIGS. 4 to 6 are diagrams for explaining the wavelength range of the light that the diffractive layer 15 reflects and the wavelength range of the light that the reflective layer 12 reflects. The curved line H in FIGS. 4 to 6 designates the quantity distribution, relative to wavelength, of the light reflected from (diffracted by) the diffractive layer 15, and the curved line C in FIGS. 4 to 6 designates the quantity distribution, relative to wavelength, of the light reflected from the reflective layer 12.

As mentioned above, it is possible to control the wavelength range of the light that the reflective layer 12 can reflect and the wavelength range of the light that the diffractive layer 15 can reflect. FIGS. 4 to 6 show the quantity distributions of light obtained by varying the selective reflection wavelength range of the reflective layer 12 and the selective reflection wavelength range of the diffractive layer 15. The respective cases shown in FIGS. 4 to 6 will be described below.

First of all, the case shown in FIG. 4 will be described. Explanation of the term "full width half maximum (FWHM)" will be given now. Referring to the diffractive layer 15 shown in FIG. 4, the full width half maximum is a distance between the two wavelengths at which the quantity of reflected light (quantity of diffracted light) is equal to a half (A/2) of the maximum quantity A of the light, and it corresponds to the range D (full width half maximum 20 nm). In other words, the full width half maximum is the wavelength range D in which the quantity of reflected light is a half (A/2) or more of the maximum quantity A of light in the quantity distribution, relative to wavelength, of the light reflected from the diffractive layer 15. The light reflected from the diffractive layer 15 contains a large quantity of light in a wavelength range of 520 to 540 nm that corresponds to this full width half maximum. For this reason, although light that appears non-green is contained in the reflected light, the reflected light (the image reconstructed from the diffractive layer 15) appears green as a whole.

On the other hand, as for the reflective layer 12 in the case shown in FIG. 4, the full width half maximum represented by the range E in which the quantity of the reflected light is a half (B/2) or more of the maximum quantity B is 60 nm. The wavelength range that corresponds to the full width half maximum is from 480 to 540 nm. Therefore, like the light reflected from the diffractive layer 15, the light reflected from the reflective layer 12 appears green as a whole.

It should be noted that since the wavelength 540 nm at which the quantity of the light reflected from the diffractive layer 15 is a half of the maximum quantity of the reflected light and the wavelength 540 nm at which the quantity of the light reflected from the reflective layer 12 is a half of the maximum quantity of the reflected light are the same, they should be provided at the same one point on the abscissa axis in FIG. 4, but that they are provided at different points on the abscissa axis in this figure for the sake of permitting a clearer understanding.

Thus, in the case shown in FIG. 4, the wavelength range corresponding to the full width half maximum of the light reflected from the diffractive layer 15 falls in the wavelength range corresponding to the full width half maximum of the light reflected from the reflective layer 12. Therefore, the light reflected from the reflective layer 12 and that reflected from the diffractive layer 15 both appear green, although there is a subtle difference in color tone.

Next, the case shown in FIG. 5 will be discussed.

In the case shown in FIG. 5, the quantity distribution H of the light reflected from (diffracted by) the diffractive layer 15 is the same as that shown in FIG. 4. Therefore, the wavelength range that corresponds to the full width half maximum H is from 520 to 540 nm.

On the other hand, as for the reflective layer 12 in the case shown in FIG. 5, the wavelength range that corresponds to the full width half maximum is from 605 to 675 nm. Therefore, the light reflected from the reflective layer 12 appears red as a whole, unlike the light reflected from the diffractive layer 15.

Thus, in the case shown in FIG. 5, the wavelength range corresponding to the full width half maximum of the light reflected from the diffractive layer 15 does not fall in the wavelength range corresponding to the full width half maximum of the light reflected from the reflective layer 12, and they do not overlap at all. For this reason, the light reflected from the reflective layer 12 appears different from the light reflected from the diffractive layer 15 in color.

Next, the case shown in FIG. 6 will be described below.

In the case shown in FIG. 6, the wavelength range that corresponds to the full width half maximum of the light reflected from the diffractive layer 15 is from 600 to 620 nm. Therefore, the light reflected from (diffracted by) the diffractive layer 15 appears red as a whole.

On the other hand, the wavelength range that corresponds to the full width half maximum of the light reflected from the reflective layer 12 is from 410 to 480 nm. The light reflected from the reflective layer 12 therefore appears blue as a whole, unlike the light reflected from the diffractive layer 15.

Thus, in the case shown in FIG. 6, the wavelength range corresponding to the full width half maximum of the light reflected from the diffractive layer 15 does not fall in the wavelength range corresponding to the full width half maximum of the light reflected from the reflective layer 12, and they do not overlap at all. The light reflected from the reflective layer 12 therefore appears different from the light reflected from the diffractive layer 15 in color.

As FIG. 6 shows clearly, a cholesteric liquid crystalline structure has wavelength selectivity whose degree is generally higher on the longer wavelength side than on the shorter wavelength side. Namely, the distribution C curve of the quantity of the light reflected from the cholesteric liquid crystalline structure is sharper on the longer wavelength side than on the shorter wavelength side. Therefore, as in the case shown in FIG. 6, when the wavelength range of the specified light that the reflective layer 12 reflects is on the shorter wavelength side than the wavelength range of the specified light that the diffractive layer 15 diffracts, more specifically, when the selective reflection center wavelength of the reflective layer 12 is shorter than that of the diffractive layer 15, it is possible to distinguish more clearly between the wavelength range of the light that the reflective layer 12 reflects and the wavelength range of the light that the diffractive layer 15 diffracts. In other words, when the wavelength range of the specified light that the reflective layer 12 reflects is on the shorter wavelength side than that of the specified light that the diffractive layer 15 reflects, the light reflected from the reflective layer 12 is more clearly distinguishable from the light reflected from the diffractive layer 15 on the basis of color.

Contrary to the case shown in FIG. 6, when the wavelength range of the specified light that the reflective layer 12 reflects is on the longer wavelength side than the wavelength range of the specified light that diffractive layer 15 diffracts, more specifically, when the selective reflection center wavelength of the reflective layer 12 is longer than that of the diffractive layer 15, it is easier to make a part of or the whole of the wavelength range of the light that the reflective layer 12 reflects agree with a part of or the whole of the wavelength range of the light that the diffractive layer 15 diffracts. In this case, it is possible to produce, with ease and certainty, an authenticity indicator that is extremely difficult to be forged, as will be described later.

(Reflectance)

Figure 7:
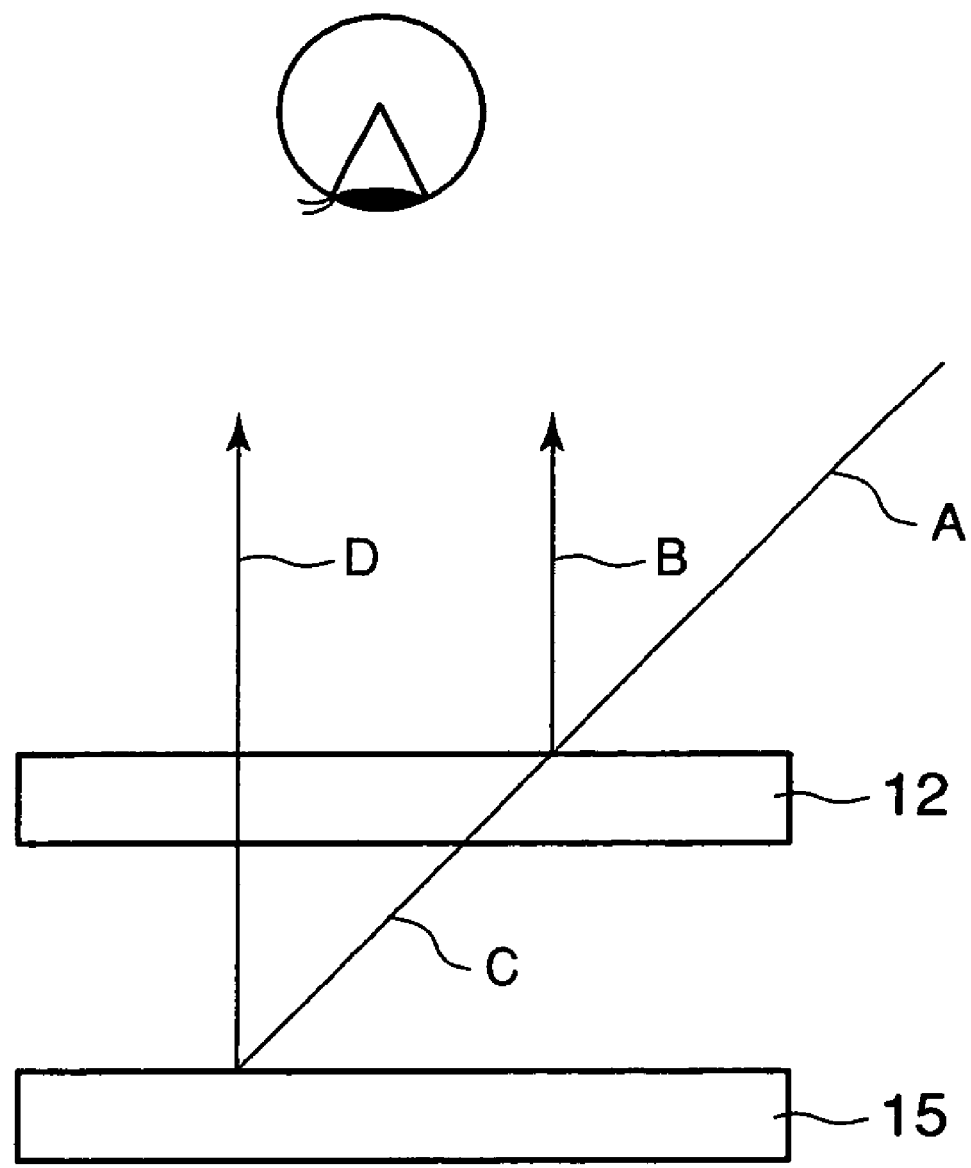
FIG. 7 is a view for explaining the reflecting action of a reflective layer and the reflecting action of a diffractive layer.

FIG. 7 is a view illustrating how the reflective layer 12 and the diffractive layer 15 reflect light when the selective reflection wavelength ranges of the two layers overlap.

For example, in the case where right-handed circularly polarized light is reflected from the reflective part 12a of the cholesteric liquid crystalline reflective layer 12, left-handed circularly polarized light is not reflected from this part 12a and passes through the reflective layer 12. Namely, the reflective part 12a of the cholesteric liquid crystalline reflective layer 12 reflects, at the maximum, a half of incident light (light rays A) and transmits the rest (light rays C). Therefore, when the reflective layer 12 is formed on the observation side, a half or more of the unpolarized incident light is not reflected from the reflective layer 12 and passes through this layer 12. The reflective layer 12 thus allows a large quantity of light (light rays C) to reach the diffractive layer 15; the diffractive layer 15 diffracts this light. Thus, when the reflective layer 12 is situated on the observation side of the diffractive layer 15, both the color of the light reflected from the reflective layer 12 (light rays B) and the image reconstructed from the diffractive layer 15 (light rays D) can be clearly viewed with sufficiently high brightness.

As mentioned above, the reflective part 12a of the reflective layer 12 may form a pattern. By changing the area of this pattern, the reflectance of the reflective layer 12 can be controlled as a whole.

On the other hand, when the diffractive layer 15 is formed on the observation side of the reflective layer 12, since the reflectance (diffraction efficiency) of the Lippmann hologram is not 100%, the light that has passed through the Lippmann hologram without being diffracted enters the reflective layer 12 and is partly reflected from the reflective layer 12. Therefore, also in this case, both the color of the light reflected from the reflective layer 12 (light rays B) and the image reconstructed from the diffractive layer 15 (light rays D) can be viewed.

(Method of Authenticity Checking, and Actions and Effects of Authenticity Indicator)

As mentioned above, it is possible to control the selective reflection wavelength range of the reflective layer 12 and the selective reflection wavelength range of the diffractive layer 15. Namely, as shown in FIGS. 4 and 5, the selective reflection wavelength range of the reflective layer 12 and the selective reflection wavelength range of the diffractive layer 15 may be made to agree at least partly. Further, as shown in FIG. 4, one of the two selective reflection wavelength ranges, the selective reflection wavelength range of the reflective layer 12 and the selective reflection wavelength range of the diffractive layer 15, may be made to cover the other (the embodiment that one of the two selective reflection wavelength ranges covers the other includes a case where the two wavelength ranges are quite the same). Furthermore, as shown in FIG. 6, it is possible to make the selective reflection wavelength range of the reflective layer 12 and the selective reflection wavelength range of the diffractive layer 15 completely incoincident with each other, that is, to make them not to agree at all.

Furthermore, one of the two wavelength ranges, the wavelength range E in which the quantity of light is a half or more of the maximum quantity B of light in the quantity distribution C, relative to wavelength, of the light reflected from the reflective layer 12 and the wavelength range D in which the quantity of light is a half or more of the maximum quantity A of light in the quantity distribution H, relative to wavelength, of the light reflected from the diffractive layer 15, may be made to cover the other (the embodiment that one of the two wavelength ranges D and E covers the other includes a case where the two wavelength ranges are quite the same). Furthermore, the wavelength range E in which the quantity of light is a half or more of the maximum quantity B of light in the quantity distribution C, relative to wavelength, of the light reflected from the reflective layer 12 may be made to be incoinsident with (to be outside) the wavelength range D in which the quantity of light is a half or more of the maximum quantity A of light in the quantity distribution H, relative to wavelength, of the light reflected from the diffractive layer 15.

In either case, the light that the reflective part 12a of the reflective layer 12 reflects is only one polarized light component, either right- or left-handed circularly polarized light. Therefore, when the light reflected from the authenticity indicator 101 is observed through a circular polarizer 50 capable of absorbing right-handed circularly polarized light, the light reflected from the reflective layer 12a that can be seen when the authenticity indicator is viewed without the circular polarizer is invisible (see FIGS. 2(b) and 2(e)). On the other hand, whether the diffractive layer 15 reflects (diffracts) light or not is independent on the direction of polarization of the light, so that even when the authenticity indicator is viewed through the circular polarizer 50, the image reconstructed from the diffractive layer 15 appears the same as the reconstructed image observed without the circular polarizer 50. The use of such a circular polarizer 50 thus makes it possible to check the authenticity of the authenticity indicator 101 with accuracy.

When the selective reflection wavelength range of the reflective layer 12 and the selective reflection wavelength range of the diffractive layer 15 are either completely or partly different from each other, the image reconstructed from the diffractive layer 15 appears different from the light reflected from the reflective part 12a of the reflective layer 12 in color. In this case, it is possible to know clearly whether the light reflected from the reflective part 12a of the reflective layer 12 is present or not.

Further, as mentioned above, it is useful for the reflective part 12a of the reflective layer 12 to form a pattern. In this case, since the light reflected from the reflective part 12a of the reflective layer 12 is visually observed as a pattern, it is possible to know clearly whether the light reflected from the reflective part 12a of the reflective layer 12 is present or not.

Furthermore, an image reconstructed from a relief hologram changes when an observer changes his viewing angle right and left. On the other hand, an image reconstructed from the diffractive layer 15 changes when an observer changes his viewing angle in two directions, right and left, and up and down, so that the reconstruction of a three-dimensional image can be done from this layer.

Furthermore, as shown in FIG. 2(*d*), when the selective reflection wavelength range of the reflective layer 12 and the selective reflection wavelength range of the diffractive layer 15 agree at least partly, the light reflected from the reflective part 12a of the reflective layer 12 is seen under the conditions under which the image reconstructed from the diffractive layer 15 can be seen. Therefore, if the diffractive layer 15, volume hologram, is forged by the use of this authenticity indicator as a master, the light reflected from the reflective part 12a of the reflective layer 12 is also recorded in the fake product. Such a fake product can be detected with ease and certainty by the above-described method of authenticity checking using a circular polarizer 50.

Furthermore, the production or reproduction of the diffractive layer 15, volume hologram, requires an advanced technique and special apparatus. Moreover, materials to be used for this are special, and their distribution is under supervision. For this reason, it is difficult to forge the diffractive layer 15.

Furthermore, an authenticity indicator 101 in the form of a laminate of the reflective layer 12 and the diffractive layer 15 is easily attachable to an object. In addition, such an authenticity indicator 101 is more effective for prevention of forgery because its authenticity can be checked by making use of the actions of both of the reflective layer 12 and the diffractive layer 15.

(Modifications)

Various modifications or alterations may be made to the aforementioned embodiment.

(1) In the above-described embodiment, a chiral nematic liquid crystal is used for the cholesteric liquid crystalline reflective layer 12. The present invention is not limited to this, and a cholesteric liquid crystal may also be used, for example. The reflective layer 12 may also be formed by the use of any other composition capable of forming a layer having helical structure portions.

(2) The above embodiment is described with reference to a case where the reflective part 12a of the reflective layer 12 forms a lattice pattern. The present invention is not limited to this. The reflective part 12a of the reflective layer 12 may be subjected to patterning to form a character, a pattern, or the like so that an image to be reconstructed is of elaborate design. Moreover, as mentioned above, only a part of the reflective part 12a of the reflective layer 12 may be made in the state of planar orientation. In this case, either the portion of the reflective part 12a that is made in the state of planar orientation or the remaining portion may be subjected to patterning to form a character, a pattern, or the like.

To pattern the reflective part 12a of the reflective layer, there may be used the method disclosed in the Japanese Patent Laid-Open Publication No. 2004-133179, for example.

The reflective layer 12 may be one having reflectance controlled by varying its thickness or helical pitch. The reflective layer 12 may also be formed on the entire surface of a layer serving as a substrate. In this case, to change the thickness of the layer serving as a substrate or the helical pitch is useful for the control of the reflectance of the reflective layer 12.

(3) In the above-described embodiment, a primer layer may further be formed between the constituent layers of the authenticity indicator by applying a primer. Such a primer layer improves the adhesion between the constituent layers. Furthermore, between the heat-sealing layer 23 and an object, another heat-sealing layer may be formed in order to increase the adhesion to the object.

(4) In the above-described embodiment, the second pressure-sensitive adhesive layer 16 and the base layer 17 are formed on the backside of the diffractive layer 15. The present invention is not limited to this, and an adherent PET layer may be formed instead of these two layers.

(5) In the above-described embodiment, a barrier layer may further be formed on the backside (on the side opposite to the observation side) of the diffractive layer 15. Depending on the combination of the resin composition used to form the diffractive layer 15, the separator, the heat-sealing layer, etc., low-molecular weight components can migrate from the diffractive layer 15 to the other layers with time. Due to this migration, the peak wavelength of the recorded hologram can shift to the blue side (shorter wavelength side), or the low-molecular weight components that have migrated to the separator or the like may affect the release properties of the separator or the like. A barrier layer may therefore be formed for the purposes of overcoming these drawbacks and improving the durability of the authenticity indicator.

Any material can be used to form such a barrier layer as long as it can present barrier properties, and, in general, the barrier layer can fulfill its purpose if it is made from a transparent organic resin material. Examples of transparent organic resin materials useful herein include solventless-type, tri- or higher functional, preferably pentafunctional, ionizing-radiation-curing epoxy-modified acrylate, urethane-modified acrylate, or acryl-modified polyester resins that react to ionizing radiation such as ultraviolet light or an electron beam. Of these, urethane-modified acrylate resins are preferred because of their excellent barrier properties.

Of the above-described ionizing-radiation-curing resins, those resins having molecular weights of 500 to 2,000 are preferred when their coating properties and the hardness, etc. of the barrier layer to be finally obtained are taken into consideration. Basically, the barrier layer is coated without using a solvent, so that it can be laminated to any of the diffractive layer, the separator, and the heat-sealing layer. Further, when the adhesion between the barrier layer and the other layers is poor, the barrier layer may be provided with, for example, a layer having the function of improving the adhesion.

(6) In the above-described embodiment, a reflection volume hologram is used as the volume hologram constituting the diffractive layer 15. The present invention is not limited to this, and a transmission volume hologram may be used as the volume hologram constituting the diffractive layer 15. In this case, by separately forming another reflective layer on the backside of the transmission volume hologram, the image recorded in the transmission volume hologram can be viewed as the light reflected from this another reflective layer. A conventional layer such as a cholesteric liquid crystal layer can be used as this another reflective layer. The another reflective layer is not needed to be transparent.

EXAMPLES

The authenticity indicator according to the present invention will now be described in more detail by way of Examples.

Example 1

An authenticity indicator 101 of Example 1, which will be described below, corresponds to the above-described embodiment shown in FIG. 1. A detailed explanation of the constituent layers, other than the reflective layer 12 and the diffractive layer 15, of the authenticity indicator 101 shown in FIG. 1 will also be made in the following description. As mentioned previously, the authenticity indicator 101 of Example 1 can be used as a label easily attachable to an object.

The authenticity indicator 101 comprises a protective layer 11, a reflective layer 12, a substrate layer (adherent PET layer) 13, a first pressure-sensitive adhesive layer 14, a diffractive layer 15, a second pressure-sensitive adhesive layer 16, a base layer (black PET layer) 17, a third pressure-sensitive adhesive layer (attachment layer) 18, and a fourth separator 19 that are laminated in the order mentioned, the protective layer 11 being the outermost layer on the observation side 5.

The protective layer 11 is a layer for protecting the surface of the authenticity indicator 101 and is formed as the outermost layer on the observation side. Since the protective layer 11 is nearly transparent, the authenticity indicator 101 can be checked for its authenticity by visually observing, through the protective layer 11, the light reflected from the cholesteric liquid crystal layer 12 and the image reconstructed from the diffractive layer 15. The protective layer 11 is required not to disturb the polarization of light entering the layer from the observation side so that the reflective layer 12 can show its polarized-light-separating properties. Therefore, to form the protective layer 11, it is desirable to use a material that is less birefringent. For example, a film made from a material selected from TAC (triacetyl cellulose), polycarbonate polymers, and cycloolefin polymers can be used as the protective layer 11.

Moreover, to form the protective layer 11, one, or two or more ingredients selected from acrylic resins, vinyl chloride—vinyl acetate copolymer resins, polyester resins, polymethacrylate resins, polyvinyl chloride resins, cellulose resins, silicone resins, chlorinated rubber, casein, a variety of surface active agents, metal oxides, etc., or a curable resin, such as an ionizing radiation curing resin that reacts to ultraviolet light, an electron beam, etc. or a thermosetting resin, may be applied by a known method.

The substrate layer 13 is an adherent PET layer made from polyethylene terephthalate (PET), having easily-adhering properties, and serves to support the reflective layer 12. This substrate layer 13 is nearly transparent. For the substrate layer 13 for supporting the reflective layer 12 can be used a film of a thermoplastic polymer selected from polycarbonate polymers, polyester polymers such as polyethylene terephthalate, polyimide polymers, polysulfone polymers, polyether sulfone polymers, polystyrene polymers, polyolefin polymers such as polyethylene and polypropylene, polyvinyl alcohol polymers, cellulose acetate polymers, polyvinyl chloride polymers, polyacrylate polymers, and polymethyl methacrylate polymers.

A typical manner in which the reflective layer 12 is laminated to the substrate layer 13 is that after applying a cholesteric liquid crystalline composition to the substrate layer 13, the layer formed is subjected to both aligning treatment and curing treatment, as mentioned previously. To make this reflective layer 12 diffusive, it is necessary to control so that the cholesteric liquid crystalline structure is not brought to the state of planer orientation. In this case, it is preferable to use, as the substrate layer 13, a layer whose surface to which the liquid crystalline composition will be applied has no aligning power. However, even when a material whose surface to which the liquid crystalline composition will be applied has aligning power, like an oriented film, is used as the substrate layer 13, the cholesteric liquid crystalline structure of the reflective layer 12 can be controlled so that it is not brought to the state of planer orientation if the surface of an oriented film serving as the substrate layer 13 is subjected in advance to surface treatment, or the components of the liquid crystalline composition are suitably selected, or the process conditions under which the liquid crystalline composition is oriented are suitably controlled.

Further, even if the substrate layer 13 whose surface to which the liquid crystalline composition will be applied has aligning power, it is possible to control the orientation of the cholesteric liquid crystalline structure by forming an intermediate layer, such as an adherent layer, between the reflective layer 12 and the substrate layer 13, thereby directing, to a plurality of directions, the directors of liquid crystalline molecules constituting the cholesteric liquid crystalline structure, existing in the vicinity of the intermediate layer. The intermediate layer such as an adherent layer can also improve the adhesion between the reflective layer 12 and the substrate layer 13. For such an intermediate layer, any material can be used as long as it is highly adherent to both the material for the reflective layer 12 and the material for the substrate layer 13, and commercially available materials may be used. Specific examples of commercially available materials useful herein include an adherent-layer-containing PET film A4100 manufactured by Toyobo Co., Ltd., Japan, and adherent materials AC-X, AC-L, and AC-W manufactured by Panack Co., Ltd., Japan.

The first pressure-sensitive adhesive layer 14 is nearly transparent and is formed by applying a pressure-sensitive adhesive. In this Example, although this layer is a pressure-sensitive adhesive layer of a pressure-sensitive adhesive, it may be a heat-sealing layer made from a heat-sealing material that reveals adhesive properties when heated and pressurized. The second pressure-sensitive adhesive layer 16 is a coating film of a pressure-sensitive adhesive. With the second pressure-sensitive adhesive layer 16, the diffractive layer 15 is laminated to the observation-side surface of the base layer 17. In this Example, since the base layer 17 is made from black polyethylene terephthalate (PET), it prevents reflection of light from the surface of an object and also improves apparent contrast to make an image sharper. The third pressure-sensitive adhesive layer 18 is an attachment layer formed by applying a pressure-sensitive adhesive; it makes the authenticity indicator 101 easily attachable to an object. The fourth separator 19 is a release member that is laminated to the back surface of the third pressure-sensitive adhesive layer 18 and that is separable from the third pressure-sensitive adhesive layer 18.

Figure 8A:
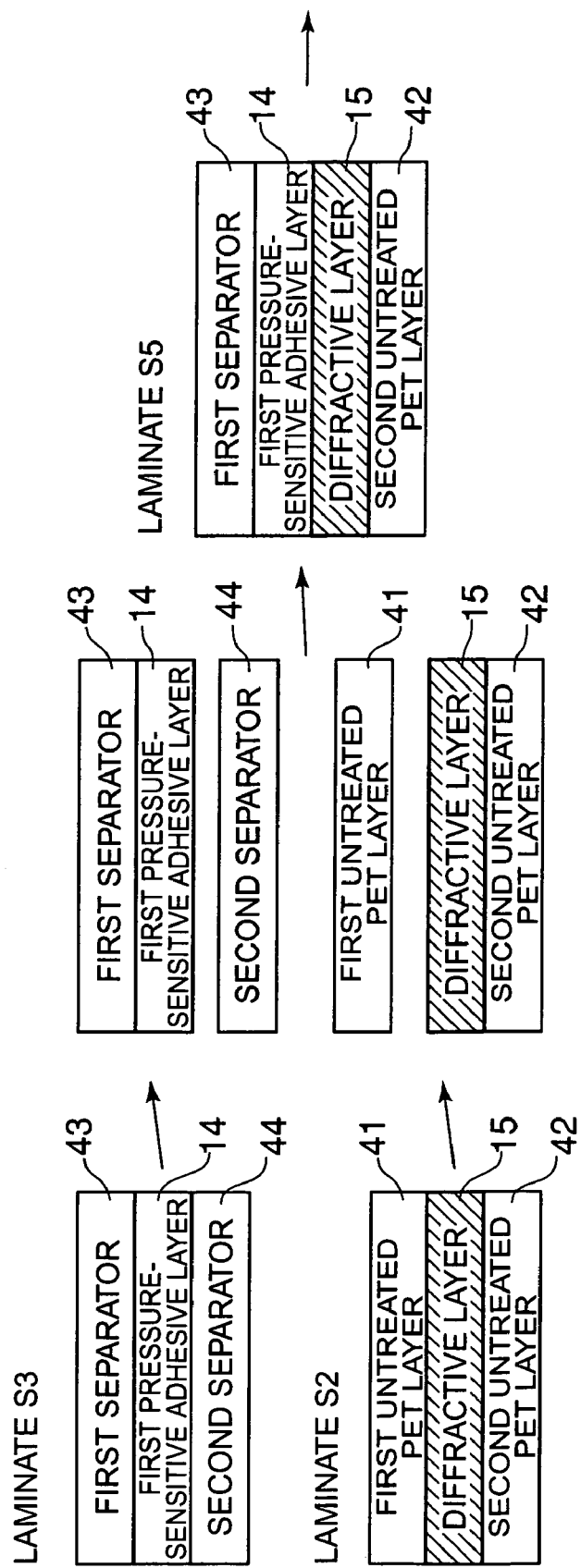
Figure 8B:
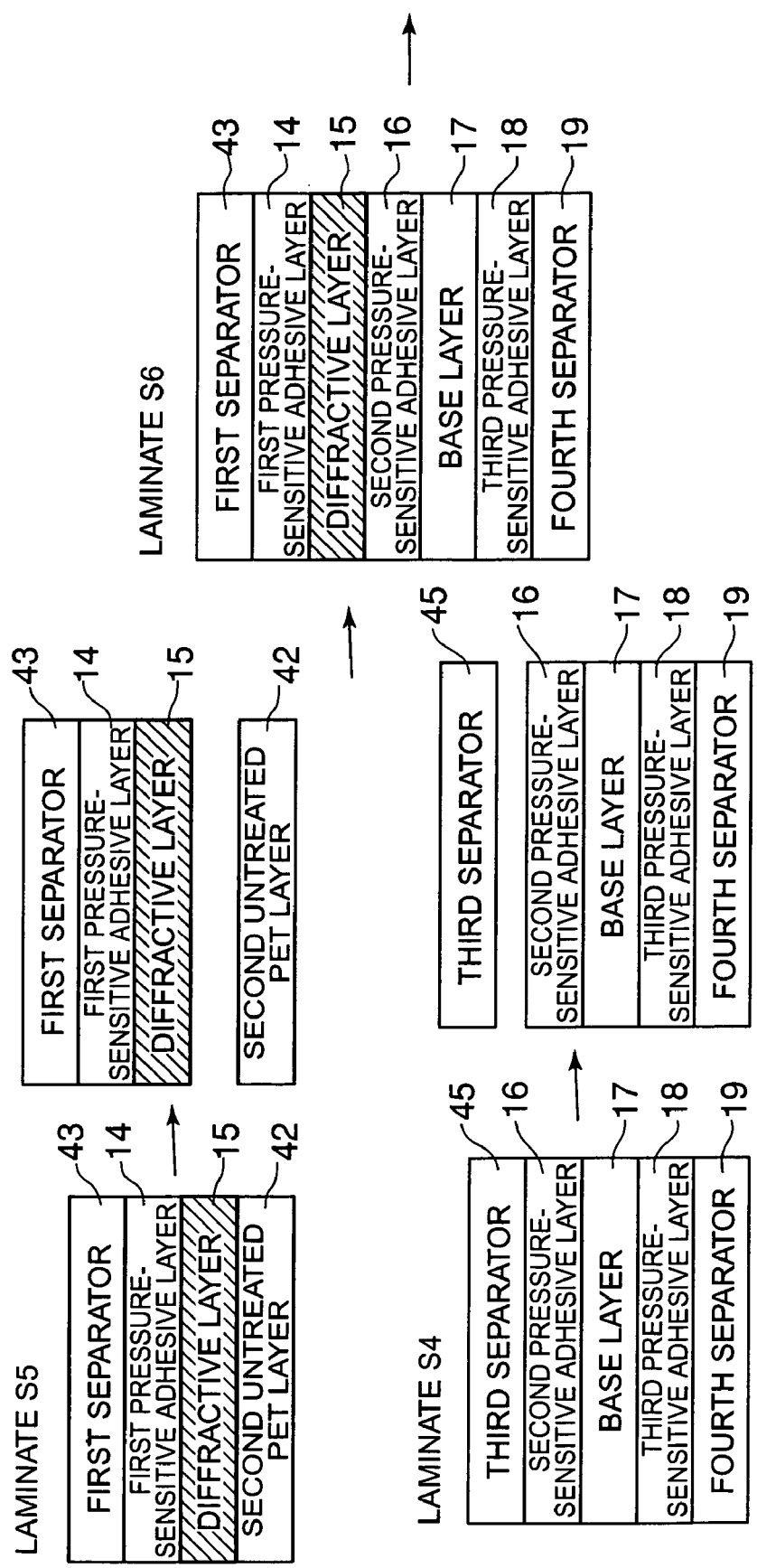

FIGS. 8A to 8C are charts showing a process for producing the authenticity indicator of Example 1. The authenticity indicator 101 of Example 1 is obtained by laminating laminates S1 to S6. These laminates will be described below.

The laminate S1 is a laminate of a protective layer 11, a reflective layer 12, and a substrate layer 13. A cholesteric liquid crystal solution having the following formulation was applied with a bar coater to the adherent surface of an adherent PET film (Cosmoshine A4100 (50 μm) manufactured by Toyobo Co., Ltd., Japan) serving as the substrate layer 13 so that the dry film would have a thickness of 1.6 μm, and was then subjected to orientation treatment (drying treatment) in an oven at 80° C.

| (Cholesteric Liquid Crystal Solution) | |
|---|---|
| Main agent, ultraviolet-curing nematic liquid crystal: | 95.8 parts by weight |
| Polymerizable chiral agent: | 4.2 parts by weight |
| Photopolymerization initiator (available from Chiba Specialty Chemicals K.K., Japan): | 5 parts by weight |

The manner in which the cholesteric liquid crystal solution was prepared is that a mixture of the above-described main agent, polymerizable chiral agent and photopolymerization initiator is dissolved in cyclohexanone.

Thereafter, 3000 mJ/cm$^2$ of ultraviolet light having a wavelength of 365 nm was applied to the reflective layer 12 in an atmosphere of nitrogen, thereby curing the reflective layer 12. Thus, there was obtained a laminate of the reflective layer 12 and the substrate layer 13, having a reflection center wavelength of 510 nm. A protective-layer-forming solution having the following composition was applied with a bar coater to the reflective layer 12 face of the above laminate of the reflective layer 12/substrate layer 13 so that the dry film would have a thickness of 2 μm, and was dried in an oven at 80° C., thereby obtaining the laminate S1.

| (Protective-Layer-Forming Solution) | |
|---|---|
| Polymethyl methacrylate (weight-average molecular weight 100,000): | 100 parts by weight |
| Methyl ethyl ketone: | 400 parts by weight |

The laminate S2 is a laminate of a first untreated PET layer 41, a diffractive layer 15 that is a volume hologram layer, and a second untreated PET layer 42. A volume-holographic-layer-forming solution having the following composition was applied with an applicator to a second untreated PET layer 42 (Lumirror T60 (50 μm), manufactured by Toray Industries Inc., Japan) so that the dry film would have a thickness of 10 μm. The wet coating of the volume-holographic-layer-forming solution was then dried in an oven at 90° C. to form a volume holographic layer, thereby obtaining a laminate of the volume holographic layer and the second untreated PET layer 42. The volume holographic layer face of this laminate was brought into close contact with a hologram master, and 80 mJ/cm$^2$ of laser light (532 nm) was applied to the laminate from the second untreated PET layer side, whereby a hologram image was recorded in the volume holographic layer, and thus a diffractive layer 15 was obtained. Thereafter, the laminate including the diffractive layer 15 was separated from the hologram master, and a first untreated PET layer 41 (Lumirror T60 (50 μm)) was laminated to the diffractive layer 15 in the laminate. This laminate was then subjected to heat treatment and ultraviolet fixation exposure treatment, thereby obtaining the laminate S2 having a reflection center wavelength of 530 nm.

| (Volume-Holographic-Layer-Forming Solution) | |
|---|---|
| Polymethyl methacrylate (weight-average molecular weight 200,000): | 100 parts by weight |
| 9,9-Bis(4-acryloxydiethoxyphenyl)-fluorene: | 80 parts by weight |
| 1,6-Hexanedioldiglycidyl ether: | 70 parts by weight |
| Diphenyliodonium hexafluoroantimonate: | 5 parts by weight |
| 3,9-Diethyl-3'-carboxymethyl-2,2'-thiacarbocyanine iodonium salt: | 1 part by weight |
| Solvent (methyl ethyl ketone/1-butanol = 1/1 (weight ratio)): | 200 parts by weight |

The laminate S3 is a laminate of a first separator 43, a first pressure-sensitive adhesive layer 14, and a second separator 44. A pressure-sensitive-adhesive-layer-forming solution having the following composition was applied with an applicator to a second separator 44 (SPPET (50 μm), manufactured by TOHCELLO Co., Ltd., Japan) so that the dry film would have a thickness of 20 μm. The second separator 44 coated with the pressure-sensitive-adhesive-layer-forming solution was then dried in an oven at 100° C., thereby obtaining a laminate of the first pressure-sensitive adhesive layer 14/second separator 44. A first separator 43 (SPPET-(38 μm) manufactured by TOHCELLO Co., Ltd., Japan) was laminated to the first pressure-sensitive adhesive layer 14 face of the laminate of the first pressure-sensitive adhesive layer 14/second separator 44, thereby obtaining the laminate S3. The first and second separators 43, 44 used in the above process were different in peel strength.

| (Pressure-Sensitive-Adhesive-Layer-Forming Solution) | |
|---|---|
| Acrylic pressure-sensitive adhesive (Nissetsu PE-118 manufactured by Nippon Carbide Industries, Co., Ltd., Japan): | 100 parts by weight |
| Isocyanate crosslinker (Nissetsu CK-101 manufactured by Nippon Carbide Industries, Co., Ltd., Japan): | 2 parts by weight |
| Solvent (methyl ethyl ketone/toluene/ethyl acetate = 2/1/1 (weight ratio)): | 60 parts by weight |

The laminate S4 is a laminate of a third separator 45, a second pressure-sensitive adhesive layer 16, a base layer (black PET layer) 17, a third pressure-sensitive adhesive layer (attachment layer) 18, and a fourth separator 19. The same pressure-sensitive-adhesive-layer forming solution as that used for forming the first pressure-sensitive adhesive layer 14 was applied with an applicator to a black PET film (Lumirror X30 (75 μm) manufactured by Toray Industries, Inc., Japan) serving as a base layer 17 so that the dry film would have a thickness of 25 μm. The base layer 17 coated with the pressure-sensitive-adhesive-layer-forming solution was then dried in an oven at 100° C., thereby obtaining a laminate of the second pressure-sensitive adhesive layer 16/base layer 17. A third separator 45 (SPPET (38 μm) manufactured by TOHCELLO Co., Ltd., Japan) was laminated to the second pressure-sensitive adhesive layer 16 face of the laminate of the second pressure-sensitive adhesive layer 16/base layer 17, thereby obtaining a laminate of the third separator 45, the second pressure-sensitive adhesive layer 16, and the base layer 17. A third pressure-sensitive adhesive layer 18 was then formed (using the same solution as that used for forming the first pressure-sensitive adhesive layer 14) on the other surface of the base layer 17, and a fourth separator 19 (SPPET (38 μm) manufactured by TOHCELLO Co., Ltd., Japan) was laminated to the third pressure-sensitive adhesive layer 18. There was thus obtained the laminate 4.

The authenticity indicator 101 of Example 1 was obtained in the following manner, using the above laminates S1 to S4.

The laminate S2 (first untreated PET layer 41/diffractive layer 15/second untreated PET layer 42) from which the first untreated PET layer 41 had been separated and the laminate 3 (first separator 43/first pressure-sensitive adhesive layer 14/second separator 44) from which the second separator 44 had been separated were laminated with the diffractive layer 15 face of the laminate S2 and the first pressure-sensitive adhesive layer 14 face of the laminate S3 facing each other, thereby obtaining a laminate S5 (first separator 43/first pressure-sensitive adhesive layer 14/diffractive layer 15/second untreated PET layer 42). The laminate S5 from which the second untreated PET layer 42 had been separated and the laminate S4 (third separator 45/second pressure-sensitive adhesive layer 16/base layer 17/third pressure-sensitive adhesive layer 18/fourth separator 19) from which the third separator 45 had been separated were laminated with the diffractive layer 15 face of the laminate S5 and the second pressure-sensitive adhesive layer 16 face of the laminate S4 facing each other, thereby obtaining a laminate S6 (first separator 43/first pressure-sensitive adhesive layer 14/diffractive layer 15/second pressure-sensitive adhesive layer 16/base layer 17/third pressure-sensitive adhesive layer 18/fourth separator 19). The laminate S6 from which the first separator 43 had been separated and the laminate S1 (protective layer 11/reflective layer 12/substrate layer 13) were laminated with the first pressure-sensitive adhesive layer 14 face of the laminate S6 and the substrate layer 13 face of the laminate S1 facing each other, thereby obtaining the authenticity indicator 101.

The authenticity indicator 101 of Example 1 can be used as a label whose authenticity can be checked by making use of the action of the reflective layer 12 and that of the diffractive layer 15. Moreover, since the authenticity indicator 101 can be provided as a label, it is easily attachable to a variety of objects.

Since the position of the reflective layer 12 is on the observation side of the diffractive layer 15, the reflective layer 12 can be formed so that the diffractive layer 15 cannot be reproduced by the use of the same laser light source and angle of incidence as those useful for the reproduction of the diffractive layer 15. For example, when the diffractive layer 15 comprises a hologram (green) that is reproducible at an angle of incidence of 30°, and if a reflective layer 12 that reflects light entering at an angle of incidence of 30° is formed on the observation side of the diffractive layer 15, the light reflected from the reflective layer 12 is also recorded when the diffractive layer 15 is reproduced, so that the reproduction of the diffractive layer 15 cannot be done successfully.

Further, the reflective layer 12 causes oblique incident light to have a phase difference regardless of reconstruction wavelength, and by increasing the thickness of the reflective layer 12, it is possible to increase the difference in phase between the light incident on the diffractive layer 15 and the light reflected from the diffractive layer 15. This makes the reproduction of the diffractive layer 15 difficult because a phase difference is made even when the reflective layer 12 does not reflect light incident at a specified angle.

Furthermore, if the reproduction of the diffractive layer 15 is attempted by using linearly polarized light, the reflective layer 12 acts as a phase plate on incident light entering from directions deviated from the normal, so that the incident light undergoes phase shift. Moreover, the light diffracted by the diffracted layer 15 undergoes phase shift again when passing through the reflective layer 12. For example, if a phase shift of $\lambda/10$ or more occurs, it becomes difficult to reproduce the diffractive layer 15. If the phase shift reaches $\lambda/2$, phase inversion occurs, so that light rays do not interfere, which is effective for the prevention of reproduction of the diffractive layer 15.

In addition, since light incident on a cholesteric reflective surface is inherently reflected partly from it, the image reflected from the reflective layer 12 is recorded while the diffractive layer 15 is reproduced. Therefore, not only the desired image but also the light component reflected from the reflective layer 12 is recorded in the hologram reproduced. For this reason, such a reproduced hologram can be judged as a fake product by the previously mentioned method of authenticity checking using a circular polarizer. Namely, the authenticity indicator of this Example is more difficult to be forged.

Example 2

Figure 9:
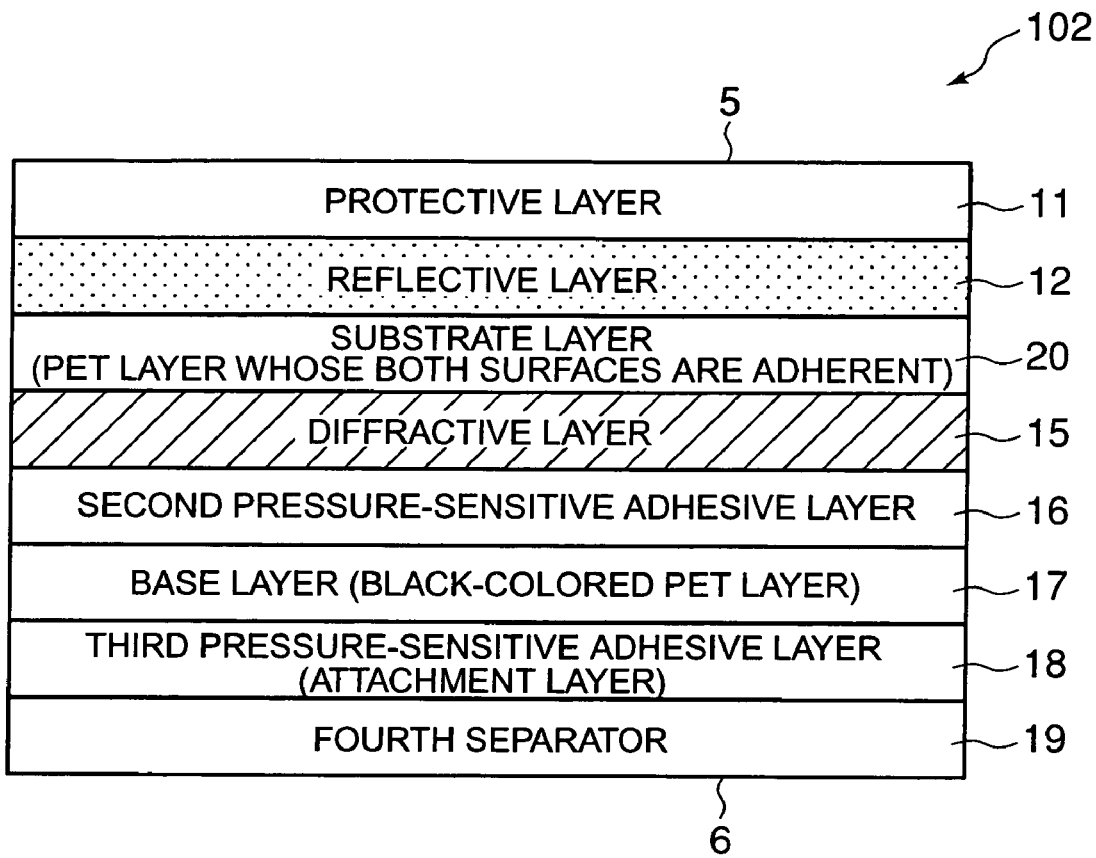
FIG. 9 is a view of a lamination showing an authenticity indicator according to Example 2.

FIG. 9 is a view showing a lamination of an authenticity indicator of Example 2 according to the invention. The authenticity indicator 102 of this Example can be used as a label easily attachable to an object.

The authenticity indicator 102 of Example 2 is composed of a protective layer 11, a reflective layer 12, a substrate layer (PET layer whose both surfaces are adherent) 20, a diffractive layer 15, a second pressure-sensitive adhesive layer 16, a base layer (black PET layer) 17, a third pressure-sensitive adhesive layer (attachment layer) 18, and a fourth separator 19 that are laminated in the order mentioned, the protective layer 11 being the outermost layer on the observation side 5.

Figure 10:
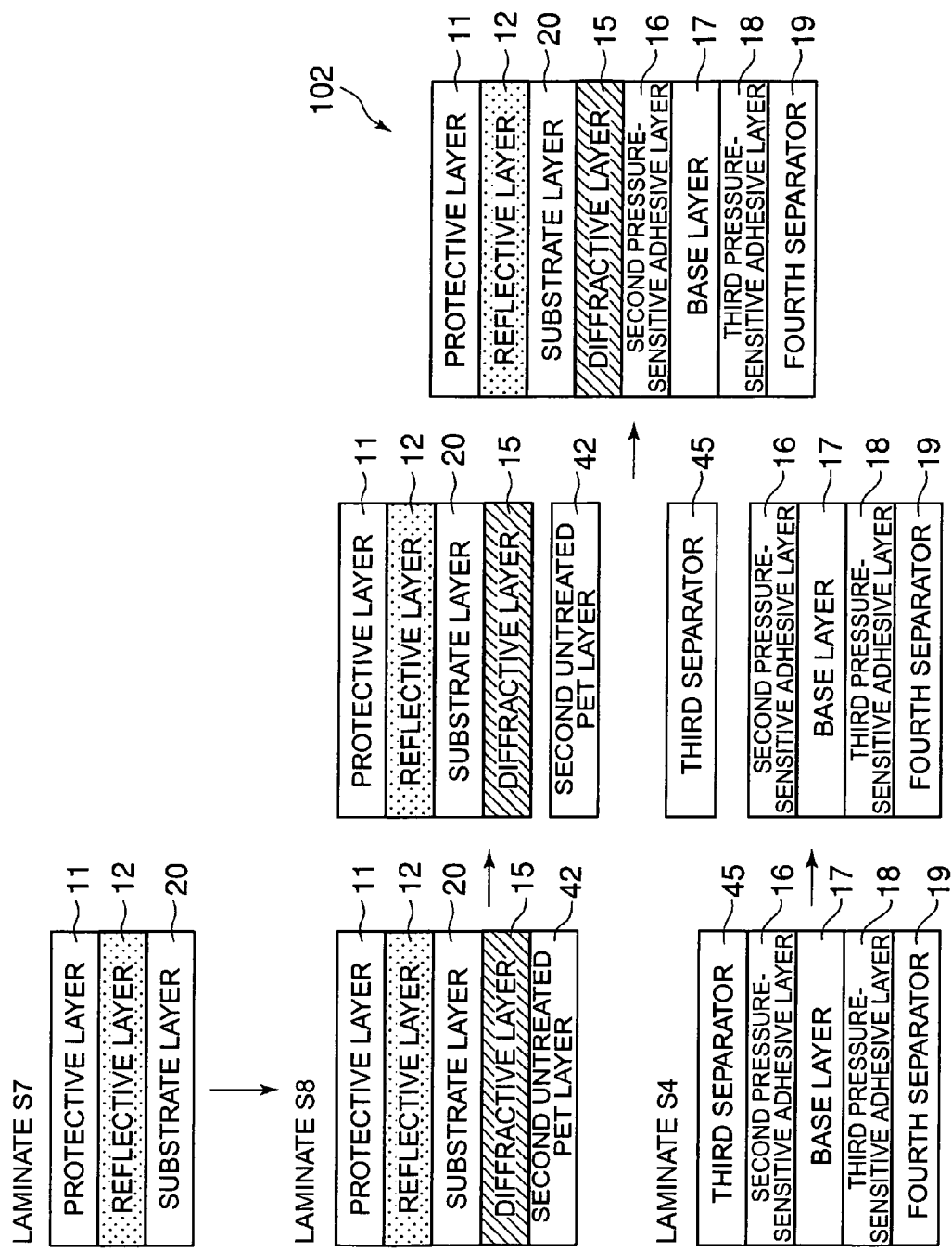
FIG. 10 is a chart showing a process for producing the authenticity indicator according to Example 2 shown in FIG. 9.

FIG. 10 is a chart showing a process for producing the authenticity indicator of Example 2.

The authenticity indicator 102 of Example 2 is obtained in the following manner using laminates S4 and S7.

The laminate S7 is a laminate of a protective layer 11, a reflective layer 12, and a substrate layer 20. This laminate S7 is the same as the laminate S1 in Example 1, except that not the adherent PET film used in Example 1 but a PET film whose both surfaces are adherent (Cosmoshine A4300 (50 μm) manufactured by Toyobo Co., Ltd., Japan) is used as the substrate layer 20. A laminate S8 (protective layer 11/reflective layer 12/substrate layer 20/diffractive layer 15/second untreated PET layer 42) was obtained in the same manner as in Example 1, except that the diffractive layer 15 was laminated to the substrate layer 20 face of the laminate S7 instead of laminating it to the first untreated PET layer 41 as in the preparation of the laminate S2 in Example 1. Thereafter, the laminate S8 from which the second untreated PET layer 42 had been separated and the laminate S4 from which the third separator 45 had been separated were laminated, with the diffractive layer 15 face of the laminate S8 and the second pressure-sensitive adhesive layer 16 face of the laminate 4 facing each other. Thus, there was obtained the authenticity indicator 102.

In Example 2, the PET film whose both surfaces are adherent was used as the substrate layer 20, and the diffractive layer 15 was formed directly on the back surface of the substrate layer 20. The present invention is not limited to this. Instead of this PET film, an adherent PET film may be used as the substrate layer 20, and the diffractive layer 15 may be formed on a pressure-sensitive adhesive layer that has been formed on the adherent PET film by applying a nearly transparent pressure-sensitive adhesive.

Example 3

Figure 11:
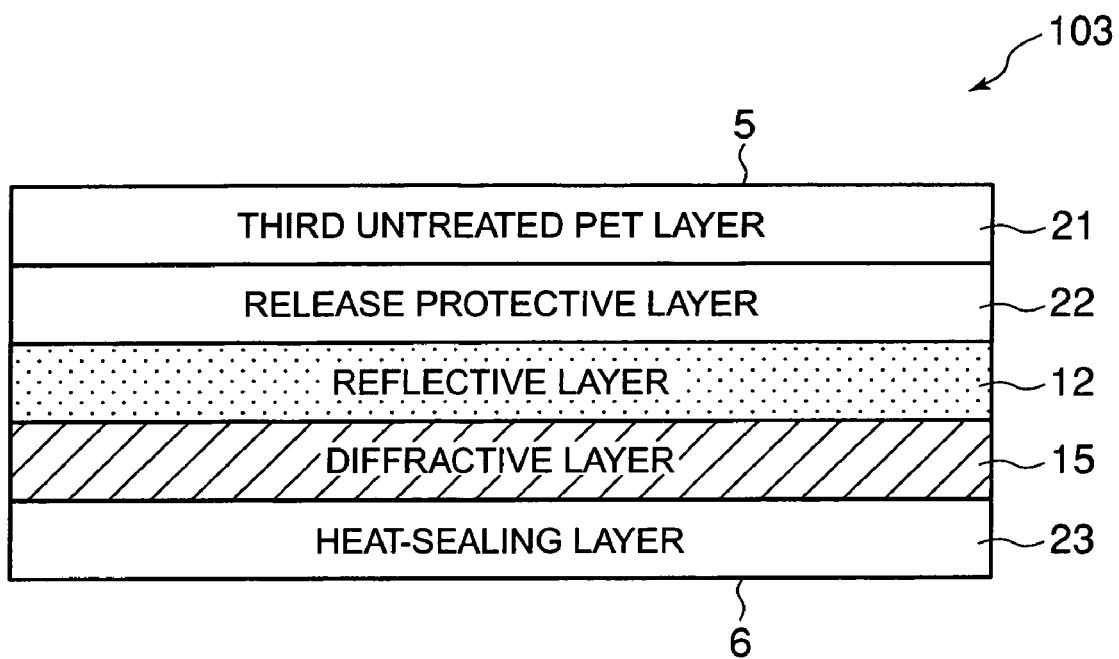
FIG. 11 is a view of a lamination showing an authenticity indicator according to Example 3.

FIG. 11 is a view showing a lamination of an authenticity indicator of Example 3 according to the invention.

The authenticity indicator 103 of Example 3 is composed of a third untreated PET layer 21, a release protective layer 22, a reflective layer 12, a diffractive layer 15, and a heat-sealing layer 23 that are laminated in the order mentioned, the third untreated PET layer 21 being the outermost layer on the observation side 5. The authenticity indicator 103 of this Example is attached to an object by transferring the reflective layer 12 and the diffractive layer 15 to the object.

The third untreated PET layer 21, the outermost layer on the observation side, is separated from the authenticity indicator after the authenticity indicator has been thermally transferred to an object.

The release protective layer 22 makes it possible to separate easily the third untreated PET layer 21 from the authenticity indicator after transferring the reflective layer 12 and the diffractive layer 15 to an object. One, or two or more materials selected from acrylic resins, vinyl chloride—vinyl acetate copolymer resins, polyester resins, polymethacrylate resins, polyvinyl chloride resins, cellulose resins, silicone resins, chlorinated rubbers, casein, a variety of surface active agents, metal oxides, etc. can be used to form the release protective layer 22. Particularly preferred is a composition consisting of an acrylic resin having a molecular weight of approximately 20,000 to 100,000 or a mixture of an acrylic resin and a vinyl chloride—vinyl acetate copolymer resin having a molecular weight of 8,000 to 20,000, and, as an additive, 1 to 5% by weight of a polyester resin having a molecular weight of 1,000 to 5,000.

The heat-sealing layer 23 is the outermost layer on the backside, and when thermally transferring the reflective layer 12 and the diffractive layer 15 to an object, it is brought into close contact with the object and is heated to stick the diffractive layer 15 to the object. The heat-sealing layer 23 thus serves as an attachment layer that makes the authenticity indicator 103 attachable to an object.

Examples of materials useful for such a heat-sealing layer 23 include thermoplastic resins such as ethylene—vinyl acetate copolymer resins (EVA), polyamide resins, polyester resins, polyethylene resins, ethylene—isobutyl acrylate copolymer resins, butyral resins, polyvinyl acetate resins, polyvinyl acetate copolymer resins, cellulose resins, polymethyl methacrylate resins, polyvinyl ether resins, polyurethane resins, polycarbonate resins, polypropylene resins, epoxy resins, phenolic resins, styrene-butadiene-styrene block copolymers (SBS), styrene-isoprene-styrene block copolymers (SIS), styrene-ethylene-butylene-styrene block copolymers (SEBS), and styrene-ethylene-propylene-styrene block copolymers (SEPS). Of the layers made from the above resins, layers that reveal heat-sealing properties at temperatures below 180° C. are preferred, and it is particularly preferable to use ethylene—vinyl acetate copolymer resins (EVA) containing not less than 25% of acetic acid. Further, the heat-sealing layer 23 may be colored, if necessary.

Figure 12:
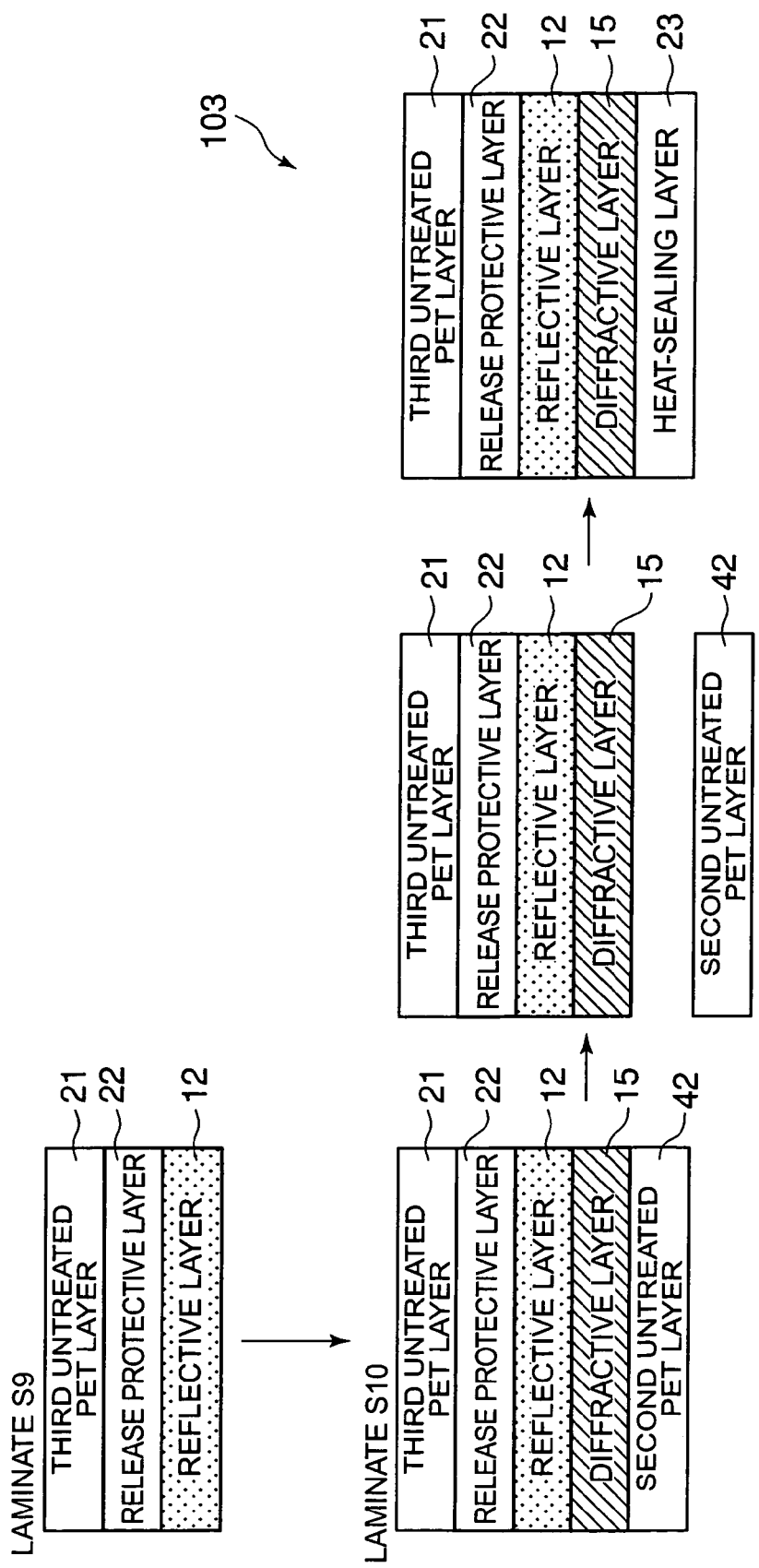
FIG. 12 is a chart showing a process for producing the authenticity indicator according to Example 3 shown in FIG. 11.

FIG. 12 is a chart showing a process for producing the authenticity indicator of Example 3.

The authenticity indicator 103 of Example 3 is produced in the following manner, using a laminate S9.

The laminate S9 is a laminate of a third untreated PET layer 21, a release protective layer 22, and a reflective layer 12. A release-protective-layer-forming solution having the following composition was applied with a bar coater to a third untreated PET layer 21 (Lumirror T60 (25 μm), manufactured by Toray Industries, Inc., Japan) so that the dry film would have a thickness of 1 μm.

| (Release-Protective-Layer-Forming Solution) | |
|---|---|
| Polymethyl methacrylate (weight-average molecular weight 100,000): | 97 parts by weight |
| Polyethylene wax (weight-average molecular weight 10,000, mean particle diameter 5 μm): | 3 parts by weight |
| Solvent (methyl ethyl ketone/toluene = 1/1 (weight ratio)): | 400 parts by weight |

The wet coating was then dried in an oven at 100° C., whereby a laminate of the third untreated PET layer 21/release protective layer 22 was obtained. The cholesteric liquid crystal solution used for forming the laminate S1 was applied with a bar coater to the release protective layer 22 so that the dry film would have a thickness of 1.6 μm, and was then subjected to orientation treatment (heat treatment) by heating it in an oven at 80° C., followed by curing treatment (e.g., curing treatment with ultraviolet light). There was thus obtained the laminate S9.

Next, a laminate S10 was prepared in the same manner as that in which the laminate S2 was prepared, except that the diffractive layer 15 was laminated to the reflective layer 12 face of the laminate 9 instead of laminating it to the first untreated PET layer 41 as in the preparation of the laminate S2. Thus, there was obtained the laminate 10 (third untreated PET layer 21/release protective layer 22/reflective layer 12/diffractive layer 15/second untreated PET layer 42). The second untreated PET layer 42 was then separated from the laminate S10. A heat-sealing-layer-forming solution having the following composition was applied with a bar coater to the diffractive layer 15 surface so that the dry film would have a thickness of 4 μm. This laminate was then dried in an oven at 100° C., thereby obtaining the authenticity indicator 103.

| (Heat-Sealing-Layer-Forming Solution) | |
|---|---|
| Polyester resin (Vylonal MD1985 manufactured by Toyobo Co., Ltd., Japan): | 100 parts by weight |
| Solvent (water/isopropyl alcohol = 1/1 (weight ratio)): | 100 parts by weight |

The authenticity indicator 103 of Example 3 is composed of a small number of layers, is thin, and can be attached to an object by means of the heat-sealing layer 23, so that it can be used as transfer foil having the function of indicating authenticity. Further, the third untreated PET layer 21, the outermost layer on the observation side, is separated from the authenticity indicator 103 after the authenticity indicator 103 has been transferred to an object, so that it does not remain on the authenticity indicator 103 transferred.

In Example 3, a primer layer may further be formed between the reflective layer 12 and the diffractive layer 15.

Furthermore, in Example 3, the third untreated PET layer 21, the outermost layer on the observation side, can be separated from the authenticity indicator 103 after the authenticity indicator 103 has been transferred to an object, and after it has been separated, the release protective layer 22 is the outermost layer of the authenticity indicator 103. Therefore, although the third untreated PET layer 21 is formed on the observation side of the reflective layer 12, it may be a birefringent member.

Example 4

Example 4 will be explained below. An authenticity indicator of Example 4 can be used as a label readily attachable to an object.

In the authenticity indicator of Example 4 and also in those of Examples 5 and 6, the diffractive layer 15 is situated on the observation side 5 of the reflective layer 12. As mentioned above, even in such authenticity indicators of Examples 4 to 6, both the image reconstructed from the diffractive layer 15 by the reflected light and the color of the light reflected from the reflective layer 12 can be viewed clearly. These authenticity indicators are thus difficult to forge and can be made so that the images reconstructed from them are of elaborate design and are clearly distinguishable.

Figure 13:
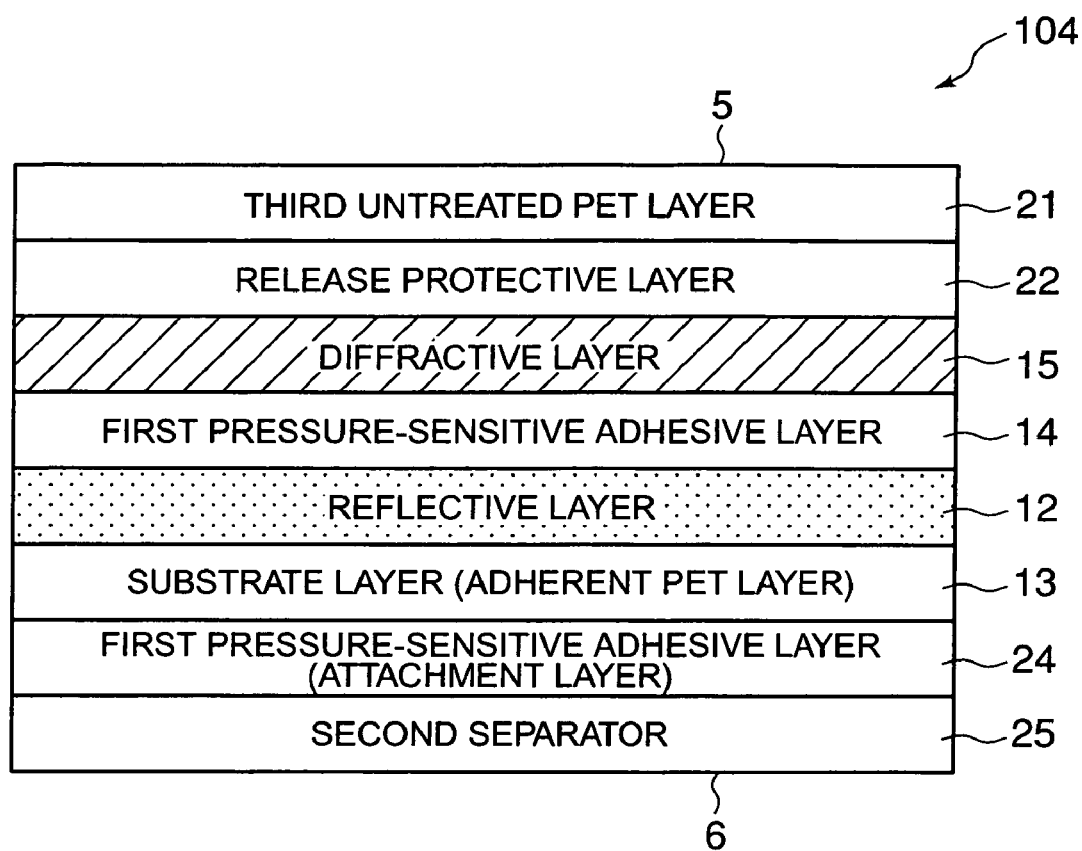
FIG. 13 is a view of a lamination showing an authenticity indicator according to Example 4.

FIG. 13 is a view showing a lamination of the authenticity indicator of Example 4.

The authenticity indicator 104 of Example 4 is composed of a third untreated PET layer 21, a release protective layer 22, a diffractive layer 15, a first pressure-sensitive adhesive layer 14, a reflective layer 12, a substrate layer (adherent PET layer) 13, a first pressure-sensitive adhesive layer (attachment layer) 24, and a second separator 25 that are laminated in the order mentioned, the third untreated PET layer 21 being the outermost layer on the observation side 5.

Figure 14:
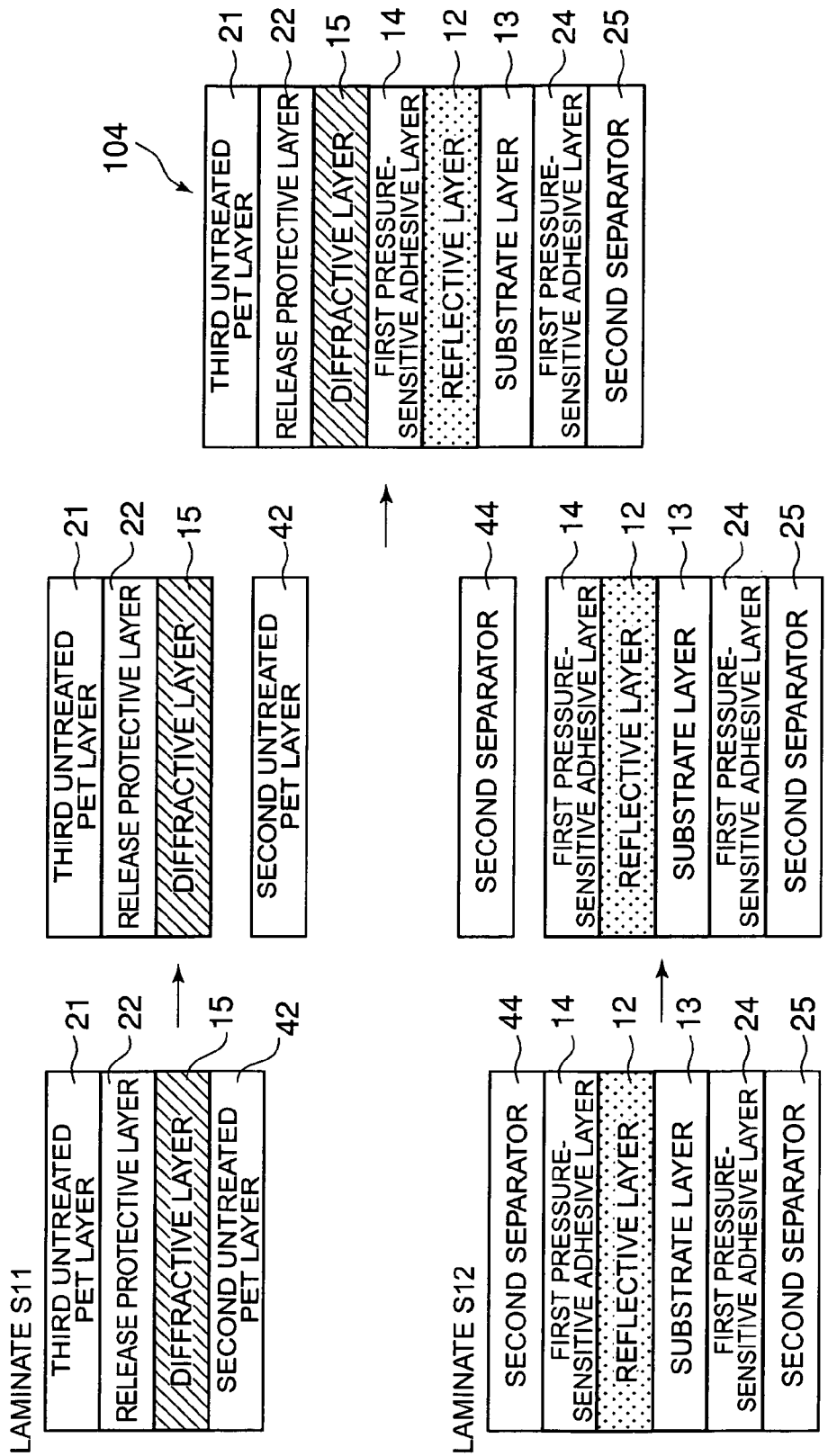
FIG. 14 is a chart showing a process for producing the authenticity indicator according to Example 4 shown in FIG. 13.

FIG. 14 is a chart showing a process for producing the authenticity indicator of Example 4. As shown in this figure, the authenticity indicator 104 was produced in the following manner, using laminates S11 and S12. The laminate S11 is composed of a third untreated PET layer 21, a release protective layer 22, a diffractive layer 15, and a second untreated PET layer 42. First, a laminate of a third untreated PET layer 21 and a release protective layer 22 was obtained in the same manner as that in which the laminate S9 was prepared in Example 3. A laminate of a diffractive layer 15 and a second untreated PET layer 42 was also obtained in the same manner as that in which the laminate of the diffractive layer 15/second untreated PET layer 42 was obtained from the laminate S2 in Example 1. The laminate of the third untreated PET layer 21/release protective layer 22 and the laminate of the diffractive layer 15/second untreated PET layer 42 were thermally laminated at 80° C., with the release protective layer 22 face of the former laminate and the diffractive layer 15 face of the latter laminate facing each other, thereby obtaining the laminate S11.

The laminate S12 is composed of a second separator 44, a first pressure-sensitive adhesive layer 14, a reflective layer 12, a substrate layer (adherent PET layer) 13, a first pressure-sensitive adhesive layer 24, and a second separator 25. This laminate S12 can be obtained by using the laminate S1 and two pieces of the laminate S3 that were described in Example 1.

First, a laminate of a reflective layer 12 and a substrate layer 13 was prepared in the same manner as that mentioned in Example 1 in the description of the process for preparing the laminate S1. The laminate S3 from which the first separator 43 had been separated and the above-obtained laminate (reflective layer 12/substrate layer 13) were then laminated with the first pressure-sensitive adhesive layer 14 of the former laminate and the reflective layer 12 of the latter laminate facing each other. Another piece of the laminate S3 from which the first separator 43 had been separated was laminated to the substrate layer 13 surface, thereby obtaining the laminate S12.

The authenticity indicator 104 can be obtained by laminating the laminate S11 from which the second untreated PET layer 42 has been separated and the laminate S12 from which the second separator 44 has been separated, with the diffractive layer 15 face of the former laminate and the first pressure-sensitive adhesive layer 24 face of the latter laminate facing each other. In Example 4, although the first pressure-sensitive adhesive layer 24 was used as the attachment layer, a heat-sealing layer 23 may be used in place of it.

In the authenticity indicator of Example 4, the diffractive layer 15 is present on the observation side (incident side) of the reflective layer 12, so that it is difficult to reproduce the polarizing properties of the reflective layer 12, although the diffractive layer 15 is reproducible. Therefore, even if a reproduced product is observed through a circular polarizer, the light reflected from the reflective layer 12 undergoes no change in its appearance, that is, the reproduced product cannot have the function of the reflective layer 12. For this reason, even if the authenticity indicator is forged, the forged product can be detected with ease.

Further, since the diffraction efficiency of the diffractive layer 15 is not 100%, the light that has passed through the diffractive layer 15 is reflected from the reflective layer 12. Therefore, when a fake authenticity indicator is produced by the use of this authenticity indicator as a master, the light component reflected from the reflected layer 12 is recorded in the fake product. Thus, the authenticity indicator of this Example is more difficult to be forged.

Example 5

An authenticity indicator of Example 5 can be used as a label readily attachable to an object.

Figure 15:
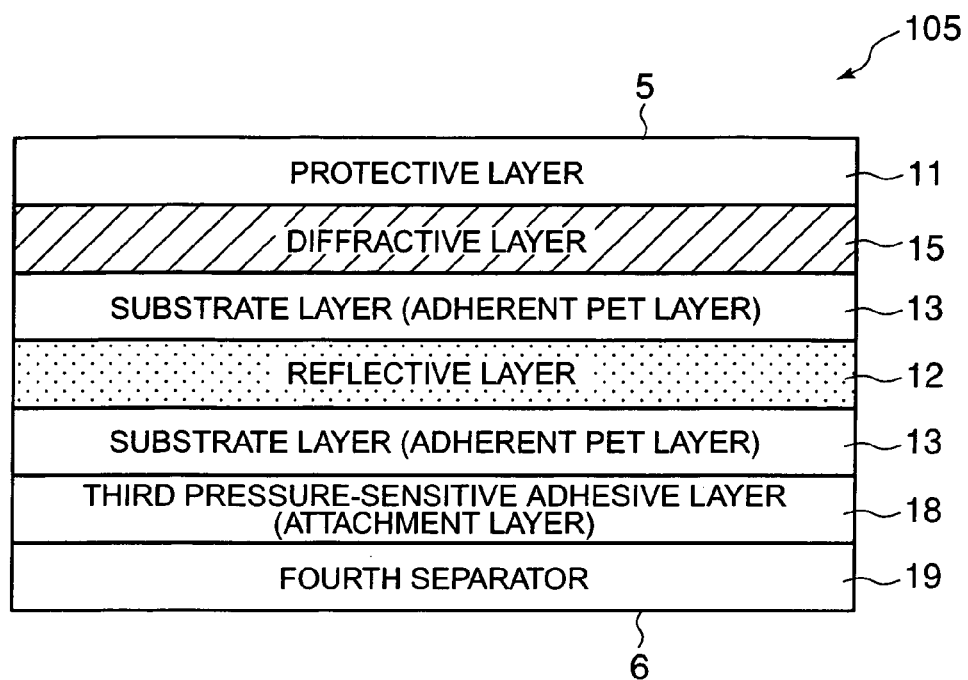
FIG. 15 is a view of a lamination showing an authenticity indicator according to Example 5.

FIG. 15 is a view showing a lamination of the authenticity indicator of Example 5.

The authenticity indicator 105 of this Example is composed of a protective layer 11, a diffractive layer 15, a substrate layer (adherent PET layer) 13, a reflective layer 12, a substrate layer (adherent PET layer) 13, a third pressure-sensitive adhesive layer (attachment layer) 18, and a fourth separator 19 that are laminated in the order mentioned, the protective layer 11 being the outermost layer on the observation side 5. If a thin layer is used for the substrate layer 13, it does not adversely affect the light-polarizing properties of the reflective layer 12, and the laminate finally obtained can be used as an authenticity indicator. Further, two layers superposed in such a way that the directions of anisotropism are perpendicular to each other may be used for the substrate layer 13 to suppress the influence of double diffraction that the substrate layers 13 might have on the reflective layer 12.

Example 6

An authenticity indicator of Example 6 is thinner than the authenticity indicators of Examples 4 and 5, and, due to its lamination, it is transferable to an object.

Figure 16:
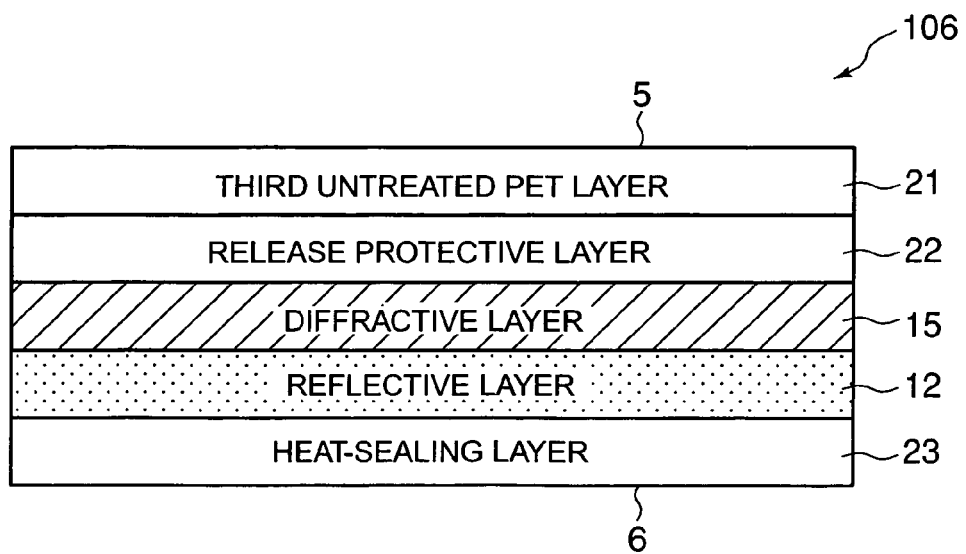
FIG. 16 is a view of a lamination showing an authenticity indicator according to Example 6.

FIG. 16 is a view showing a lamination of the authenticity indicator of Example 6.

The authenticity indicator 106 of this Example is composed of a third untreated PET layer 21, a release protective layer 22, a diffractive layer 15, a reflective layer 12, and a heat-sealing layer 23 that are laminated in the order mentioned, the third untreated PET layer 21 being the outermost layer on the observation side 5. The authenticity indicator 106 is produced in the following manner: the second untreated PET film 42 is separated from the laminate S1 in Example 4, and to the diffractive layer 15 is applied, in the same manner as in Example 4, the cholesteric-reflective-layer-forming solution used in the preparation of the laminate S1, thereby forming a reflective layer 12; the heat-sealing-layer-forming solution used in the production of the authenticity indicator 103 is then applied to the reflective layer 12 by the same method as that employed in the production of the authenticity indicator 103, thereby forming the heat-sealing layer 23. Thus, there is obtained the authenticity indicator 106. The third untreated PET film 21 formed as the outermost layer on the observation side is separated from the authenticity indicator 106 after the authenticity indicator 106 has been thermally transferred to an object, so that it does not remain on the authenticity indicator transferred.

Example 7

In Example 7 was produced an authenticity indicator containing a diffractive layer 15 whose reflection wavelength range was different from that of the reflection layer 15 used for the above-described authenticity indicators of Examples 1 to 6. To form the reflective layer 12 in this Example, a cholesteric liquid crystal solution was applied to a PET film so that the dry film would have a thickness of 4 µm. Further, the reflection center wavelength and the full width half maximum of the reflective layer 12 were made 640 nm and 70 nm, respectively. Consequently, in the authenticity indicator of Example 7, the wavelength range of the light that the reflective layer 12 reflects and that of the light that the diffractive layer 15 reflects are different from each other, so that the light reflected from the reflective layer 12 and the light reflected from the diffractive layer 15 can be seen more clearly. Further, when the authenticity indicator was viewed through a circular polarizer 50, the light reflected from the reflective layer 12 significantly changed in appearance. It was thus possible to check the authenticity of the authenticity indicator with ease and accuracy.

The invention claimed is:

1. An authenticity indicator in the form of a sheet, whose authenticity can be checked by observing light reflected from it, comprising:
   a reflective layer comprising a reflective part, the reflective part having a cholesteric liquid crystalline structure and reflecting specified light, and
   a diffractive layer comprising a volume hologram and diffracting specified light,
   wherein the reflective layer and the diffractive layer are configured and positioned such that one of two wavelength ranges, the wavelength range in which a quantity of light is a half or more of a maximum quantity of light in a quantity distribution, relative to wavelength, of the specified light reflected from the reflective layer and the wavelength range in which a quantity of light is a half or more of a maximum quantity of light in a quantity distribution, relative to wavelength, of the specified light diffracted by the diffractive layer, covers the other.

2. The authenticity indicator according to claim 1, wherein one of two wavelength ranges, the wavelength range of the specified light reflected from the reflective layer and the wavelength range of the specified light diffracted by the diffractive layer, covers the other.

3. The authenticity indicator according to claim 1, wherein a wavelength at which a quantity of light peaks in a quantity distribution, relative to wavelength, of the specified light reflected from the reflective layer is longer than a wavelength at which a quantity of light peaks in a quantity distribution, relative to wavelength, of the specified light diffracted by the diffractive layer.

4. The authenticity indicator according to claim 1, wherein the reflective part of the reflective layer is superposed only on a part of the diffractive layer.

5. The authenticity indicator according to claim 1, wherein the reflective part has the cholesteric liquid crystalline structure in planar orientation.

6. The authenticity indicator according to claim 1, wherein the reflective layer further comprises a transparent part transmitting incident light.

7. The authenticity indicator according to claim 6, wherein the reflective layer comprises an array of reflective parts and an array of transparent parts.

8. The authenticity indicator according to claim 1, wherein only a part of the reflective part has the cholesteric liquid crystalline structure in planar orientation.

9. The authenticity indicator according to claim 1, further comprising, as an outermost layer on a backside opposite to a observation side, an attachment layer that makes the authenticity indicator attachable to an object.

10. The authenticity indicator according to claim 9, further comprising a release member laminated to a back surface of the attachment layer, the release member being separable from the attachment layer.

11. The authenticity indicator according to claim 1, wherein the diffractive layer comprises a reflection volume hologram.

12. The authenticity indicator according to claim 1, wherein the reflective layer and the diffractive layer are configured and positioned such that the wavelength range in which a quantity of light is a half or more of a maximum quantity of light in a quantity distribution, relative to wavelength, of the specified light reflected from the reflective layer, covers the wavelength range in which a quantity of light is a half or more of a maximum quantity of light in a quantity distribution, relative to wavelength, of the specified light diffracted by the diffractive layer.

13. The authenticity indicator according to claim 1, wherein the reflective layer and the diffractive layer are configured and positioned such that the wavelength range in which a quantity of light is a half or more of a maximum quantity of light in a quantity distribution, relative to wavelength, of the specified light diffracted by the diffractive layer, covers the wavelength range in which a quantity of light is a half or more of a maximum quantity of light in a quantity distribution, relative to wavelength, of the specified light reflected from the reflective layer.

14. The authenticity indicator according to claim 1, wherein the wavelength range of the specified light reflected from the reflective layer covers the wavelength range of the specified light diffracted by the diffractive layer.

15. The authenticity indicator according to claim 1, wherein the wavelength range of the specified light diffracted by the diffractive layer covers the wavelength range of the specified light reflected from the reflective layer.

* * * * *